US010929731B2

(12) United States Patent
Beitel

(10) Patent No.: US 10,929,731 B2
(45) Date of Patent: Feb. 23, 2021

(54) OPTICAL SIGNATURE GENERATION, DISTRIBUTION AND DISPLAY

(71) Applicant: Kenneth James Beitel, Boulder, CO (US)

(72) Inventor: Kenneth James Beitel, Boulder, CO (US)

(73) Assignee: Cyberline, Inc., Boulder, CO (US)

( * ) Notice: Subject to any disclaimer, the term of this patent is extended or adjusted under 35 U.S.C. 154(b) by 0 days.

(21) Appl. No.: 16/927,486

(22) Filed: Jul. 13, 2020

(65) Prior Publication Data

US 2021/0012172 A1 Jan. 14, 2021

Related U.S. Application Data

(60) Provisional application No. 62/873,572, filed on Jul. 12, 2019, provisional application No. 62/876,619, filed on Jul. 20, 2019.

(51) Int. Cl.
*G06K 19/06* (2006.01)
*G06Q 50/00* (2012.01)
*H04W 4/08* (2009.01)
*H04W 4/021* (2018.01)

(52) U.S. Cl.
CPC ....... *G06K 19/06103* (2013.01); *G06Q 50/01* (2013.01); *H04W 4/021* (2013.01); *H04W 4/08* (2013.01)

(58) Field of Classification Search
USPC ............................................ 235/462.01, 494
See application file for complete search history.

(56) References Cited

U.S. PATENT DOCUMENTS

| 8,573,499 | B1 * | 11/2013 | Boyle ................. G06F 16/9554 235/462.09 |
| 9,325,770 | B2 * | 4/2016 | Cho ................... H04M 1/72533 |
| 2009/0181653 | A1 | 7/2009 | Alharayeri |
| 2014/0045472 | A1 * | 2/2014 | Sharma ................ H04L 63/065 455/416 |
| 2016/0026908 | A1 | 1/2016 | van der Merwe et al. |
| 2019/0052697 | A1 * | 2/2019 | Wu ........................ H04L 67/06 |
| 2019/0357339 | A1 | 11/2019 | Kim et al. |
| 2020/0151358 | A1 | 5/2020 | Czajka et al. |

OTHER PUBLICATIONS

WIPO, International Search Report and the Written Opinion of the International Searching Authority, or the Declaraion, PCT patent application No. PCTUS20/41817, dated Oct. 29, 2020, pp. 1-7.

\* cited by examiner

*Primary Examiner* — Tuyen K Vo
(74) *Attorney, Agent, or Firm* — Bachmann Law Group PC

(57) ABSTRACT

A system generates, distributes, and displays an optical signature on devices with a display and wearable devices. The optical signature can be provided as part of an optical signature set to one or more users to allow them to communicate information to each other visually. The optical signature is displayed by a device associated with a first user for interpretation by a second user. The optical signature conveys information about the first user such as interaction type being sought with a second user and characteristics of the user being sought to interact with. The optical signature may be composed of any combination of shapes, colors, geometric patterns, pictures or video displayed statically or in motion or holographic images. A user with a displayed optical signature can find other users locally and remotely.

30 Claims, 39 Drawing Sheets

| Optical Signature Id | Optical Signature | Long Term | Short Term | Affection | Friends | Exclusive | Non Exclusive | Female | Male | Other |
|---|---|---|---|---|---|---|---|---|---|---|
| A-1 | svg data | x | | | | | | | | |
| A-2 | svg data | | x | | | x | | | | |
| A-3 | svg data | | | x | | x | | | | |
| A-4 | svg data | | | | x | | | | | |
| A-5 | svg data | x | | | | x | | | | |
| A-6 | svg data | | x | | | | x | | | |
| A-7 | svg data | | | x | | | x | | | |
| A-8 | svg data | | | | x | | x | | | |
| B-1 | svg data | x | | | | x | | x | | |
| B-2 | svg data | | x | | | x | | x | | |
| B-3 | svg data | | | x | | x | | x | | |
| B-4 | svg data | | | | x | x | | x | | |
| B-5 | svg data | x | | | | | x | x | | |
| B-6 | svg data | | x | | | | x | x | | |
| B-7 | svg data | | | x | | | x | x | | |
| B-8 | svg data | x | | | x | | x | x | | |
| C-1 | svg data | x | | | | x | | | x | |
| C-2 | svg data | | x | | | x | | | x | |
| C-3 | svg data | | | x | | x | | | x | |
| C-4 | svg data | | | | x | x | | | x | |
| C-5 | svg data | x | | | | | x | | x | |
| C-6 | svg data | | x | | | | x | | x | |
| C-7 | svg data | | | x | | | x | | x | |
| C-8 | svg data | | | | x | | x | | x | |

FIGURE 18

| Optical Signature Id | Optical Signature | Long Term | Short Term | Affection | Friends | Exclusive | Non Exclusive | Female | Male | Other |
|---|---|---|---|---|---|---|---|---|---|---|
| D-1 | svg data | x | | | | | | | | x |
| D-2 | svg data | | x | | | x | | | | x |
| D-3 | svg data | | | x | | x | | | | | x |
| D-4 | svg data | x | | | x | x | | | | x |
| D-5 | svg data | | | | | | x | | | |
| D-6 | svg data | | x | x | | | x | | | x |
| D-7 | svg data | | | | | | x | | | x |
| D-8 | svg data | | | | x | | | | | |
| E-1 | svg data | x | | | | x | | x | x | |
| E-2 | svg data | | x | x | | x | | x | x | |
| E-3 | svg data | | | | x | x | | x | x | |
| E-4 | svg data | x | | | | | x | x | x | |
| E-5 | svg data | | x | | | | x | x | x | |
| E-6 | svg data | | | x | | | x | x | x | |
| E-7 | svg data | x | | | | x | | | x | |
| E-8 | svg data | | x | x | | x | | | x | x |
| F-1 | svg data | | | | x | x | | | x | x |
| F-2 | svg data | | | | | x | | | x | x |
| F-3 | svg data | x | | x | | | x | | x | x |
| F-4 | svg data | | x | | | | x | | x | x |
| F-5 | svg data | | | | | | x | | x | x |
| F-6 | svg data | | | x | x | | | | x | x |

FIGURE 19

| Optical Signature Id | Optical Signature | Long Term | Short Term | Affection | Friends | Exclusive | Non Exclusive | Female | Male | Other |
|---|---|---|---|---|---|---|---|---|---|---|
| G-1 | svg data | x | | | | | | x | | x |
| G-2 | svg data | | x | | | x | | x | | x |
| G-3 | svg data | | | x | | x | | x | | x |
| G-4 | svg data | | | | x | x | | x | | x |
| G-5 | svg data | x | | | | | x | x | | x |
| G-6 | svg data | | x | | | | x | x | | x |
| G-7 | svg data | | | x | | | x | x | | x |
| G-8 | svg data | | | | x | | x | x | | x |
| H-1 | svg data | x | | | | x | | x | x | x |
| H-2 | svg data | | x | | | x | | x | x | x |
| H-3 | svg data | | | x | | x | | x | x | x |
| H-4 | svg data | | | | x | x | | x | x | x |
| H-5 | svg data | x | | | | | x | x | x | x |
| H-6 | svg data | | x | | | | x | x | x | x |
| H-7 | svg data | | | x | | | x | x | x | x |
| H-8 | svg data | | | | x | | x | x | x | x |

FIGURE 20

| Optical Signature Id | UserId | Geolocation |
|---|---|---|
| A-1 | 26b26f2f-4e2e-47b1-a454-3103e9224349 | {"latitude": 34.0522342, "longitude": -118.2436849 } |
| C-4 | fcc50738-4bcb-4eb5-a6a9-8341e115edd0 | {"latitude": 34.0522342, "longitude": -118.2436849 } |
| B-3 | be339eb7-6e1c-4f8b-8c40-4ba7e70fbceb | {"latitude": 34.0522342, "longitude": -118.2436849 } |
| D-7 | 6fad837f-c3b5-4fa6-95ba-7c26d9d9e533 | {"latitude": 34.0522342, "longitude": -118.2436849 } |

Day 1
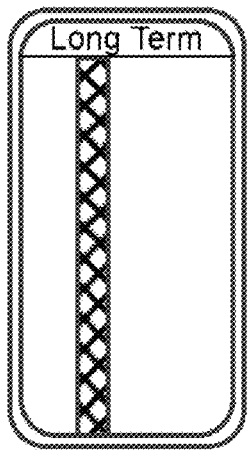 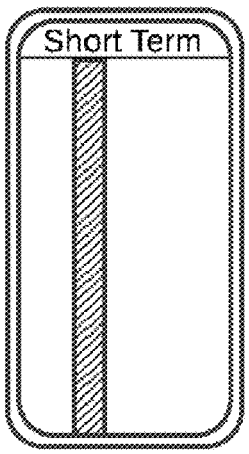 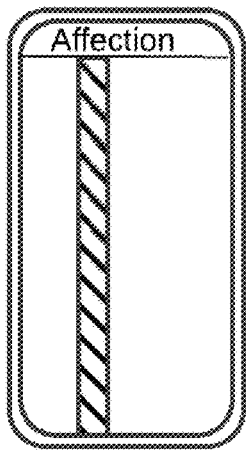 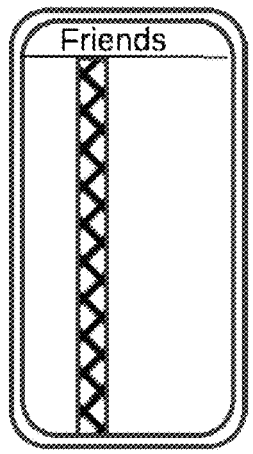
Day 2
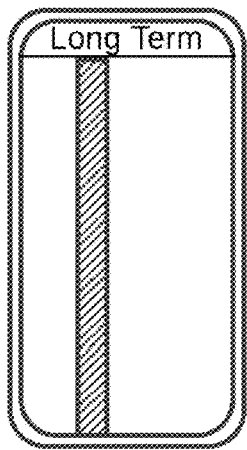 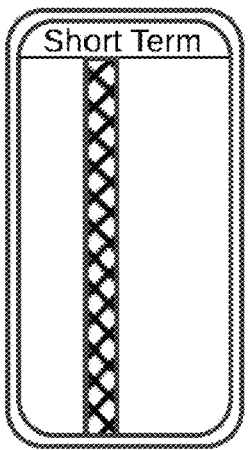 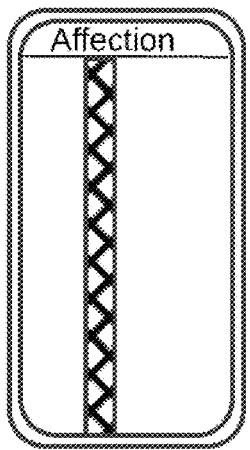 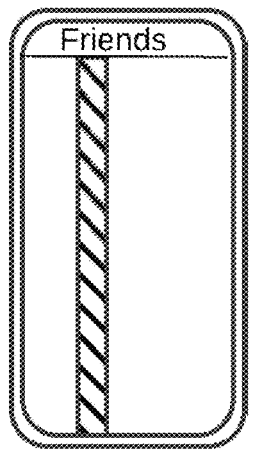
Day 3 etc.
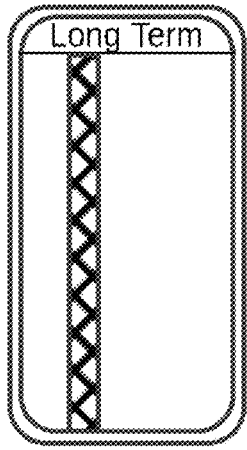 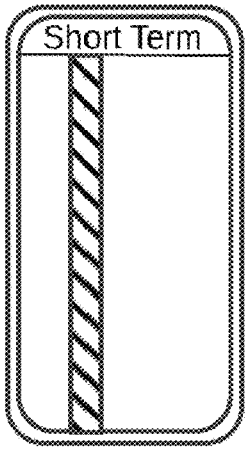 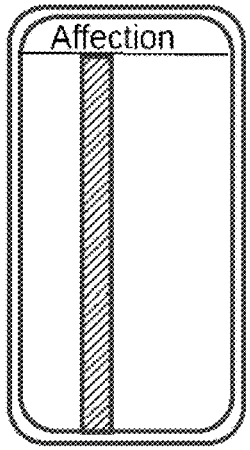 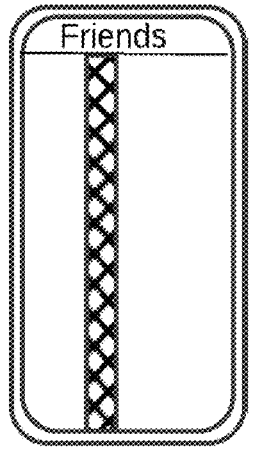
FIGURE 25

| Optical Signature Id | Optical Signature | Investor | Tech Company | Series A | Series B | Series C | Angel | Seed |
|---|---|---|---|---|---|---|---|---|
| A-1 | svg data | x | | | | | | x |
| A-2 | svg data | x | | | | | x | |
| A-3 | svg data | x | | | | x | | |
| A-4 | svg data | x | | | x | | | |
| A-5 | svg data | x | | x | | | | |
| B-1 | svg data | | x | | | | | x |
| B-2 | svg data | | x | | | | x | |
| B-3 | svg data | | x | | | x | | |
| B-4 | svg data | | x | | x | | | |
| B-5 | svg data | | x | x | | | | |

FIGURE 36

OPTICAL SIGNATURE GENERATION, DISTRIBUTION AND DISPLAY

CROSS REFERENCE TO RELATED APPLICATIONS

The present application claims the priority benefit of U.S. provisional patent application 62/873,572, filed on Jul. 12, 2019, titled "OPTICAL DIGITAL SIGNATURE GENERATION, DISTRIBUTION AND DISPLAY METHOD AND SYSTEM," and U.S. provisional patent application 62/876,619, filed on Jul. 20, 2019, titled "OPTICAL DIGITAL SIGNATURE GENERATION, DISTRIBUTION AND DISPLAY METHOD AND SYSTEM," the disclosures of which are incorporated herein by reference.

BACKGROUND

Cell phone concert mobile applications have a screen or phone camera flash in response to audio, ultrasonic audio, or other cues, typically changing the entire cell phone screen to a single color. The intended use is an entertaining visual display.

Quick Response (QR) Codes and barcodes displayed on mobile devices provide the ability to communicate a relatively large amount of information but are not human readable, are intended for the owner of the device, and require close proximity—typically within a few inches—in order to be scanned.

Furthermore, QR Codes and Barcodes displayed on mobile devices convey complex information that require close proximity for scanning functionality. A QR code released in 2015 that was designed to be both machine and human readable has very limited human readability and requires machine scanning to be performed in close proximity.

What is needed is an improved method for communicating information using electronic devices.

SUMMARY

The present technology, roughly described, is a system that generates, distributes, and displays an optical signature on devices with a display and wearable devices. The optical signature can be provided as part of an optical signature set to one or more users in order to allow them to communicate information to each other visually. The optical signature is displayed by a device associated with a first user for interpretation by a second user. The optical signature conveys information about the first user such as a preference for an interaction type being sought and user characteristics of a second user (or other users) being sought to interact with.

The optical signature may be composed of color, shapes, video (such as a vector image video), images, and may have digital and/or visual effects such as movement, morphing, fading, and other effects. Different aspects of an optical signature convey different meanings. For example, a first component of an optical signature may convey a relationship preference, while a second component of an optical signature may convey a gender preference.

A user with a displayed optical signature can find other users locally and remotely. An optical signature for a first user may be visible to a second user that is within distance of the first user's device to visually see and interpret the optical signature. For example, an optical signature may be displayed on a user's smart phone, smart watch, wearable device or some other device, such that a second user between 1-6 feet away, or in some instances farther, can see and interpret the optical signature on the first user's device. Additionally, the first user may search for users remote to the first user through a user search tool provided by the present system. Using the search tool, the first user may search for other users displaying an optical signature conveying the interaction type being sought by the first user with the other user also having the user characteristics specified by the first user.

In some instances, the present technology performs a method for providing an optical signature on a user device. The method may include receiving an optical signature set from a remote server by a first device associated with a first user, wherein the optical signature set containing a plurality of optical signatures, each optical signature associated with an interpersonal interaction type a user is seeking. The method continues with selecting, based on input from the first user received by the first device, an optical signature to display by the first device from the optical signature set. The optical signature can be displayed on the first device, the optical signature displayed at a scale such that the optical signature can be viewed and interpreted by a second user not associated with the first device. The method also provides optical signature data associated with the first user's displayed optical signature, desired interaction types, and desired user characteristics sought by the first user to the remote server. In addition to the method, a system may have one or more processors, memory, and modules stored in memory and executed by the processors to perform the method for providing an optical signature on a user device. Also, a computer readable medium may have embodied thereon a program, the program being executable by a processor to perform the method for providing an optical signature on a personal device.

In some instances, the present technology performs a method for providing an optical signature. The method includes generating, by a server, an optical signature set, the optical signature set containing a plurality of optical signatures, wherein each optical signature set includes an optical signature meaning index and effective and expiration dates for the set. The optical signatures can be generated from optical signature components associated with an interaction type or a user characteristic, wherein the combined optical signature components forming the meaning of the optical signature. The method also includes receiving a request for an optical signature set from a remote device by the server, wherein the request including a user identifier, transmitting the optical signature set to the remote device by the server. In addition to the method, a system may have one or more processors, memory, and modules stored in memory and executed by the processors to perform the method for providing an optical signature. Also, a computer readable medium may have embodied thereon a program, the program being executable by a processor to perform the method for providing an optical signature.

BRIEF DESCRIPTION OF FIGURES

FIGS. 18-20 illustrates an optical signature meaning index.

FIG. 21 illustrates a user to optical signature to geolocation index.

FIG. 25 illustrates examples of optical signatures with signature meanings that are periodically randomized.

FIG. 36 illustrates an optical signature meaning index in the context of a business interaction.

DETAILED DESCRIPTION

Figure 1:
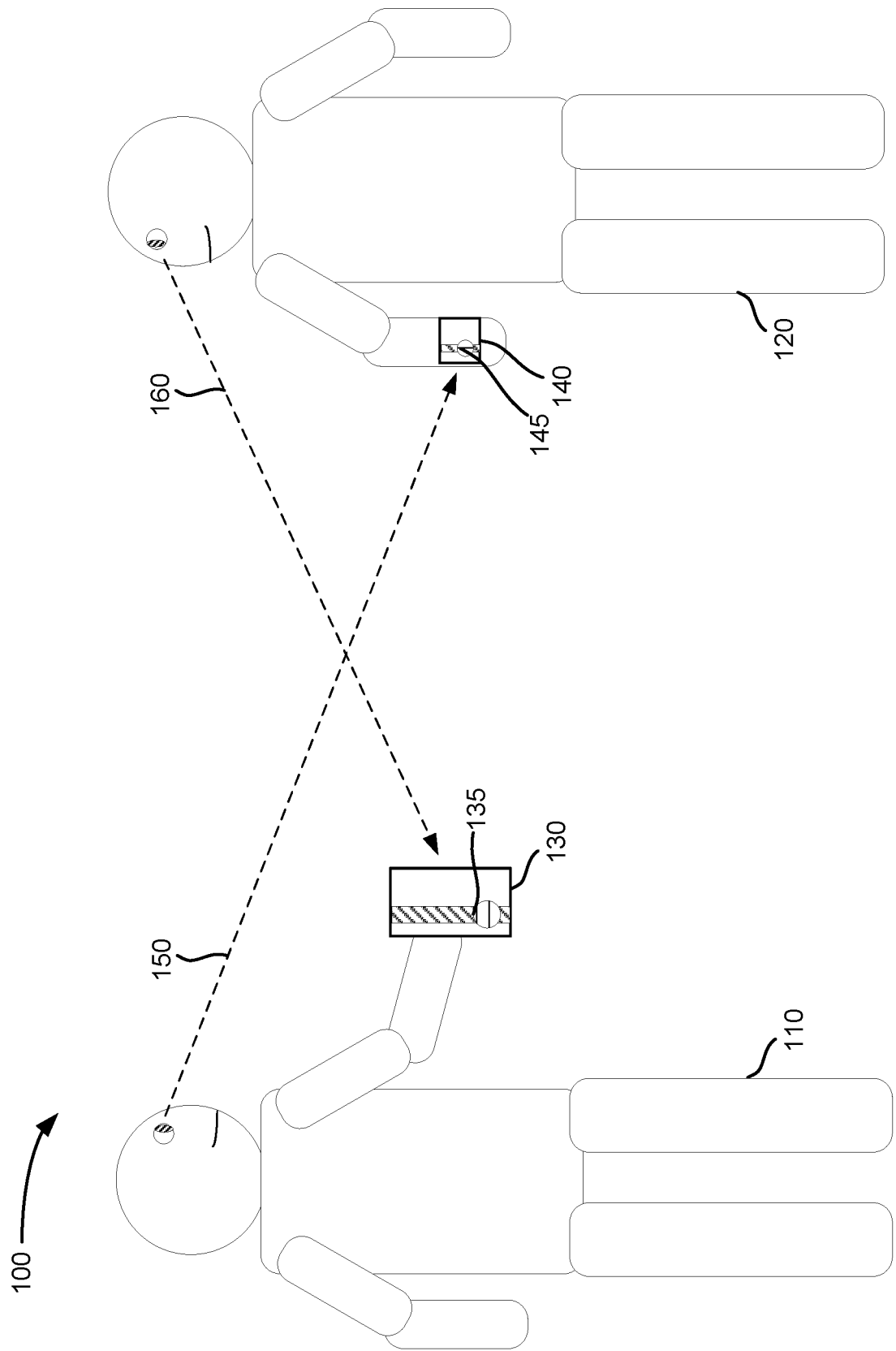
FIG. 1 illustrates two users interpreting each other's optical signatures in a local environment.

The present technology generates, distributes, and displays an optical signature on devices with a display and wearable devices. The optical signature can be provided as part of an optical signature set to one or more user devices in order to allow the user devices to visually communicate information to other users (users other than the user associated with the device displaying the optical signature). The optical signature is displayed by a device associated with a first user for interpretation by a second user. The optical signature conveys information about the first user such as a preference for an interaction type and desired user characteristics of a second user (or other users) with which the interaction is sought.

The optical signature may be composed of shapes, video (such as a vector image video), images, and may have digital and/or visual effects such as movement, morphing, fading, and other effects. The optical signature, in some instances, can include one or more of an augmented reality image element, an audio-visual element, a color, a hologram, an image, or a pattern. In some instances, the optical signature may include non-textual elements to convey information and/or represent one or more meanings.

There have been long standing technical problems and challenges related to communicating between users with computing devices. Most methods of communication require that the sender's and receiver's device electronic address, such as a phone number, is known to each other. For example, for an SMS text message, the user prepares a message, provides the recipient's phone number, initiates the transmission, and a messaging application transmits the message to the recipient device associated with the phone number. When a recipient phone number is not known, and neither is the recipient themselves, traditional communication methods do not work for communication between the sender and an unknown recipient.

The present invention solves the technical problem by configuring a device to act as a communication tool that provides information to an individual other than the device user. The present technology allows the user to select, using an application installed on the user's device, an outgoing message in the form of an optical signature, and provide the outgoing message using the device. The optical signature is displayed on the device, by a hardware controller which controls the display of the device, in a manner that allows individuals other than the device user to view and interpret the optical signature displayed on the user's device. Other features described herein further serve to overcome the technical problems that have existed and remain unsolved in this technical field.

In some instances, an optical signature can be any combination of shapes, colors, geometric patterns, slow or rapid changes in illumination or use of flashing or pulsing lights or displays, pictures, pictures or video displayed statically or in motion on a two- or three dimensional medium.

Different aspects of an optical signature may convey different meanings. For example, a first portion or visual element of an optical signature may convey a relationship type preference, while a second portion or visual element of an optical signature may convey a gender preference.

In some instances, the optical signature provided by a server to a user device can vary. For example, the server can provide a single signature rather than a set of optical signatures based on a request for service that includes information on a user's desired interaction. The server can also provide a single whole optical signature with a single meaning.

In some instances, optical signatures can be built into an application rather than generated and received from a server. Applications containing embedded optical signatures can be downloaded to mobile and wearable devices from one or more servers, such as for example distributed servers or peer to peer networks. Additionally, optical signatures embedded in an application can be synchronized with a plurality of other devices by the optical signatures having an effective and expiration date time. In some instances, optical signatures embedded in an application do not change in meaning and remain constant.

In some instances, users of an optical signature application interface or a website can generate an optical signature and meanings either as a single signature, a set of optical signatures or as multiple optical signatures. The user generated signatures or optical signatures and meanings can be shared with a plurality of other users via peer-to-peer networks including text or social media networks or via a central server with other users. The user generated signatures can be displayed via mobile or wearable devices and displayed on a searchable optical signature map client application or website. In some instances, meanings of the optical signatures can trigger gaming or entertainment related interactions between users. In some instances, users having a presence in a virtual environment can use optical signatures within the virtual environment to facilitate interactions with other users having a presence in the virtual world.

A user with a displayed optical signature can find other users locally and/or remotely. An optical signature for a first user may be visible to a second user that is within a distance of the first user to visually see and interpret the optical signature. For example, an optical signature may be displayed on a user's smart phone, smart watch, or some other device, such that a second user between 1-6 feet away, or in some instances farther, can see and interpret the optical signature on the first user's device. Additionally, the first user may search for users remote to the first user through a user search tool provided by the present system. Using the search tool, the first user may search for other users currently displaying an optical signature and meeting characteristic preferences configured by the first user.

In some instances, a user device associated with a user can receive an optical signature set from a remote server by a first device associated with a first user, wherein the optical signature set contains a plurality of optical signatures, and each optical signature can be associated with a meaning that is defined by an optical signature meaning index or mapping that provides a textural description of the meaning associated to each optical signature.

In some instances, effective and expiration dates of optical signatures can be implemented to provide synchronization of a plurality of devices. The effective and expiration dates allow the optical set and signature to meaning index to be updated from a remote server without updating the client application of a device. As a result, updates of the signature to meaning index can help maintain the confidentiality of a signature meaning to users of the optical signature system.

FIG. 1 illustrates two users interpreting each other's optical signatures in a local environment. The environment 100 includes a first user 110 and a second user 120. First user 110 has a mobile device 130, such as for example a smart phone or tablet computer, and second user 120 has a smart watch 140. Each of the first user and second user have accounts with an optical signature system and have optical signatures displayed on their respective devices. In particular, user 110 has optical signature 135 displayed on device 130 and user 120 has optical signature 145 displayed on device 140.

The optical signatures are displayed on devices 130 and 140 such that users other than the user associated with the particular device can see and interpret the optical signatures. In particular, optical signature 135 on device 130 of user 110 can be seen by user 120 via line of sight 160. Similarly, optical signature 145 on user device 140 of user 120 can be seen by user 110 via line of sight 150.

As shown in FIG. 1, optical signatures are designed to be seen and interpreted by a user other than the user associated with the device on which the optical signature is displayed. As such, an optical signature may have a sufficient size, intensity, and appearance such that it can be viewed and interpreted by a human at a distance of between 5-6 feet away. In some instances, the optical signature is displayed such that it can be viewed and interpreted from between 3 to 6 feet away. In some instances, the optical signature is displayed such that it can be viewed and interpreted from between 3 to 6 feet away. In some instances, the optical signature is displayed such that it can be viewed and interpreted between 1-6 feet away.

In some instances, the first user's optical signature displayed on a first device may be viewed and interpreted by a second user from distances between 3 and 12 feet. In some instances, the optical signature may be seen but the distance is too great to allow interpretation. In this case the optical signature may still provide utility by indicating the displaying user is seeking an interaction even if the type of interaction is not able to be discerned. If the user displaying the optical signature appears to be of interest, the user viewing a distant optical signature may move within a distance that allows interpretation of the optical signature meaning.

Figure 2:
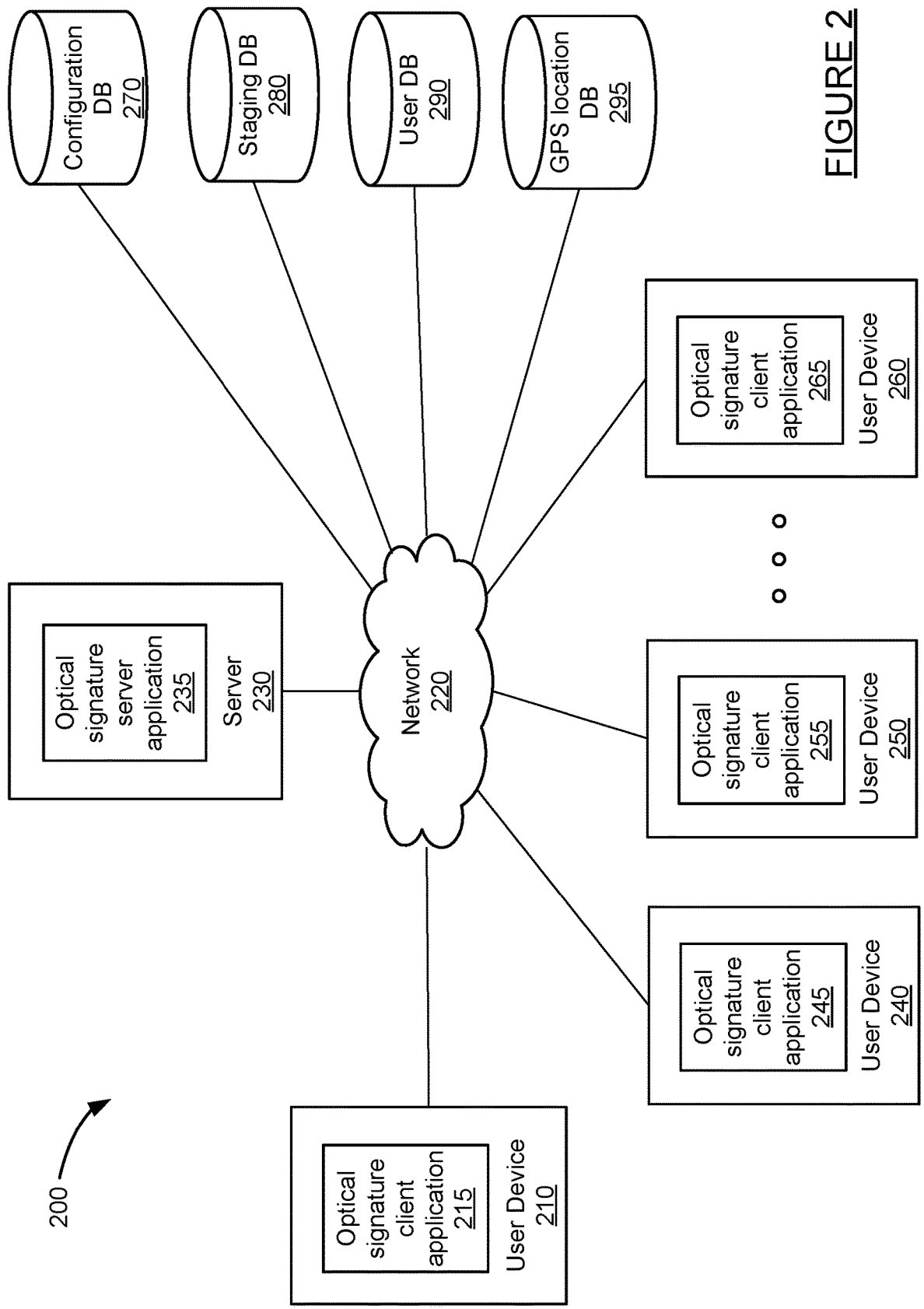
FIG. 2 illustrates a block diagram of an optical signature management system.

FIG. 2 illustrates a block diagram of an optical signature management system. System 200 of FIG. 2 includes user device 210, server 230, user devices 240,250, and 260, configuration database 270, staging database 280, user database 290, and GPS location database 295. Devices 210 and 230-295 may communicate through network 220 and optionally other communication mechanisms.

User device 210 may include any device associated with a particular user and existing remotely from server 230. Examples of user device 210 may include a smart phone, tablet, laptop computer, chrome book, smart watch and other computing device. In some instances, a user device may include an electronical wearable device, such as for example illuminating fabrics and electronic jewelry capable of displaying colors, shapes, geometric patterns representing the optical signature.

User device 210 may include optical signature client application 215. Application 215 may communicate with one or more remote server applications and databases, display optical signatures, and perform other functionality described herein. Optical signature client application 215 is discussed in more detail with respect to the client application of FIG. 3.

Additional users may be associated with user devices 240-260. User devices 240-260 may also include client applications 245, 255, and 265, respectively. The client applications 245, 355 and 260 may each display an optical signature in response to input provided by a user associated with the particular user device. Similar to user device 210, each user device 240 to 260 may be remote from server 230.

Though four user devices are illustrated in the system of FIG. 2, more or fewer user devices may be used with the present system. The user devices illustrated in FIG. 2 are depicted as examples only, and any number of user devices can be used with the optical signature system of the present technology.

Network 220 may communicate with the user devices 210, 240, 215, 260, server 230, and databases 270-295. Network 220 may be implemented as one or more private networks, public networks, an intranet, the Internet, the World Wide Web, a cellular network, a plain old telephone service, a wireless network, Bluetooth connectivity, a Wi-Fi network, a MiFi network, a local area network, a wide area network, or any combination of these networks.

Server 230 may be implemented as one or more physical or logical servers that communicate with an optical signature client application over network 220. Server 230 may include optical signature server application 235. The optical signature server application 235 may generate optical signature sets, manage optical signature protocols, generate and manage a user to optical signature to geolocation index and a signature to meaning index, manage GPS search functions, and perform other functions. Optical signature server application 230 is discussed in more detail with respect to the system of FIG. 4.

Configuration database 270 may store configuration data for optical signature components. For example, the configuration database may store schedules for updating optical signatures, source data for optical signature meaning indexes, and other data.

Staging database 280 may be used to store the most recent version of various optical signature sets. In some instances, optical signature sets are updated, generated, and deleted over time. The optical signature sets are stored in database 280 and updated by optical signature server application 235 over network 220 within staging database 280.

User database 290 may include user information, including but not limited to user account information, login information, user characteristics, and other user data. The user characteristics may include one or more fields for a user related to a particular theme of optical signatures. For example, for an optical signature associated with a relationship, the user characteristics may include relationship type preference, gender preference, length of relationship desired, and other characteristics. For an optical signature associated with a business conference, for example, the user characteristics may include current position, technology preference, job interests, funding interests, and other business-related characteristics.

GPS location database 295 may include GPS data for one or more users. The GPS data may be updated as users permit their geolocation to be broadcast to other users and as user devices transmit geolocation data to server application 235. In some instances, GPS location database 295 may store all or a part of a signature identifier (ID) to a user identifier (ID) to geolocation index.

Figure 3:
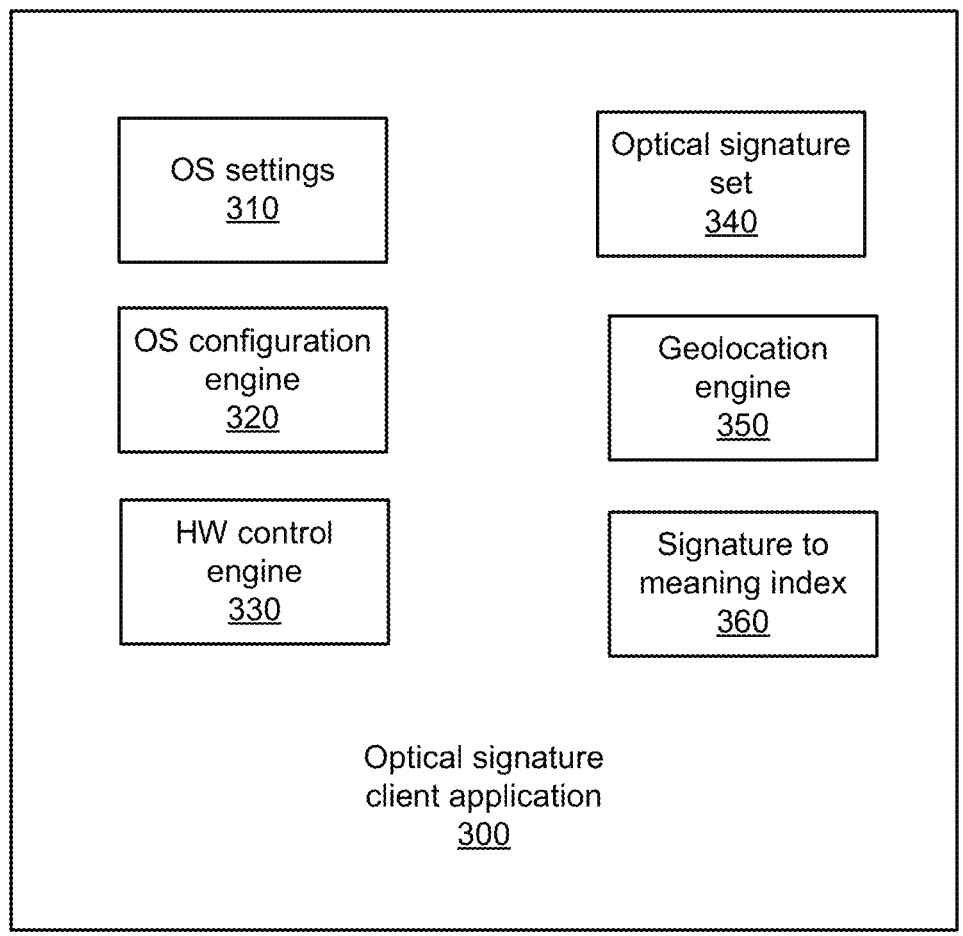
FIG. 3 illustrates a block diagram of an optical signature client application.

FIG. 3 illustrates a block diagram of an optical signature client application. The optical signature client application 300 of FIG. 3 provides more detail for client applications 215, 245, 255, and 265 of FIG. 2. Client application 300 includes optical signature settings 310, optical signature configuration engine 320, hardware control engine 330, optical signature step 340, user to optical signature to geolocation index 350, and signature the meaning index 360.

Optical signature settings 310 may specify various settings associated with the optical signature. For example, some optical signature settings may include whether to automatically display the optical signature based on certain events or timers, or only display an optical signature based on user input, whether the optical signature should be displayed or not at all, and other settings.

Optical signature configuration engine 320 may select an optical signature from one or more optical signature sets received from a server application. For example, based on user input that specifies desired interaction type and user characteristics, the optical signature configuration engine 320 may use the signature to meaning index to select an optical signature that corresponds to the input received from the user and that will be displayed by hardware control engine 330. In some instances, the user might not initially select an optical signature, but rather will eliminate optical signatures the user does not want to display. In this instance, the optical signature configuration engine will reduce the number of optical signatures available based on user input then allow the user to make a final selection while viewing the remaining optical signatures and meanings.

Hardware control engine 330 may provide an optical signature graphic through a user device display component. Optical signature set 340 may include one or more sets of optical signatures received from a server application. The optical signature sets may be stored or accessible by client application 300 and used to provide the displayed optical signature.

Geolocation engine 350 may access the user's geolocation and provide the geolocation for transmission to the server. The geolocation may be in the form of GPS data or other data. For example, when a user sends geographical information including a center point and a radius, the center point includes geolocation coordinates provided by geolocation engine 350.

A signature to meaning index 360 may be used to display meanings of optical signatures that may displayed by the current user of application 300 or optical signatures of other users that may of interest.

The client application of FIG. 3 and the modules therein are exemplary. More or fewer modules may be implemented to perform the functionality described herein, and the specific modules listed in the block diagram of FIG. 3 are not intended to be limiting.

Figure 4:
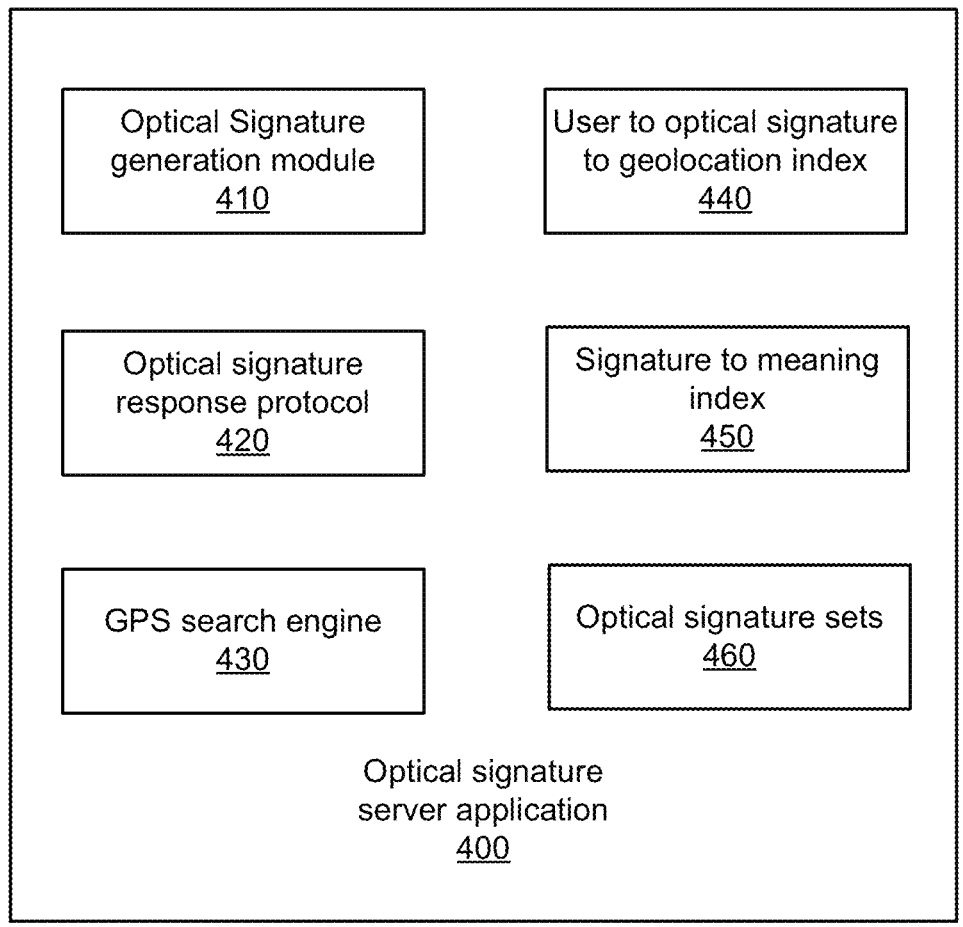
FIG. 4 illustrates a block diagram of an optical signature server application.

FIG. 4 illustrates a block diagram of an optical signature server application. Optical signature server application 400 provides more detail for server application 235 of the system of FIG. 2. Server application 400 includes optical signature generation module 410, optical signature response protocol 420, GPS search engine 430, user to optical signature to geolocation index 440, signature to meaning index 450, an optical signature set 460. Optical signature generation module 410 may generate the components, which can include visual elements, from which optical signatures are formed. The generated optical signatures are combined in sets and transmitted to one or more clients. The optical signature generation module may generate components at random, based on predetermined settings and configuration parameters, or other inputs.

Optical signature response protocol 420 may control the protocol of messages such as the transmission of optical signature sets to a user device. For example, the optical signature response protocol may require that optical signature set messages include the optical signature set and signature to meaning index.

GPS search engine 430 may determine which users are within a particular geo-fence or area around a particular user that is requesting a user location search. The GPS search engine may access coordinates for different users and determine the distance between multiple users. In some instances, the GPS search engine may search several types of geolocation coordinate data to determine the location of users and the distance between a requesting user and other users. In some instances, the GPS search engine will only search and process location data for users that are currently broadcasting their location.

A user to optical signature to geolocation index 440 may include a table or other data structure that associates a user ID, an optical signature ID, and geolocation data. An example of such an index is discussed with respect to FIG. 21.

A signature to meaning index 450 may include a pairing of optical signature to a particular meaning. For example, a meaning for a particular optical signature graphic may indicate whether the particular user desires a long-term relationship or short-term relationship. Examples of an optical signature to meaning index are discussed with respect to FIGS. 18-20.

Optical signature sets 460 may include sets of optical signatures that are transmitted to users of the optical signature system. Each optical signature includes one or more components related to a particular theme of interaction. For example, a first optical signature set may relate to a personal relationship theme, while a second optical signature set may relate to a business conference theme.

The server application of FIG. 3 and the modules therein are exemplary. More or fewer modules may be implemented to perform the functionality described herein, and the specific modules listed in the block diagram of FIG. 4 are not intended to be limiting.

Figure 5:
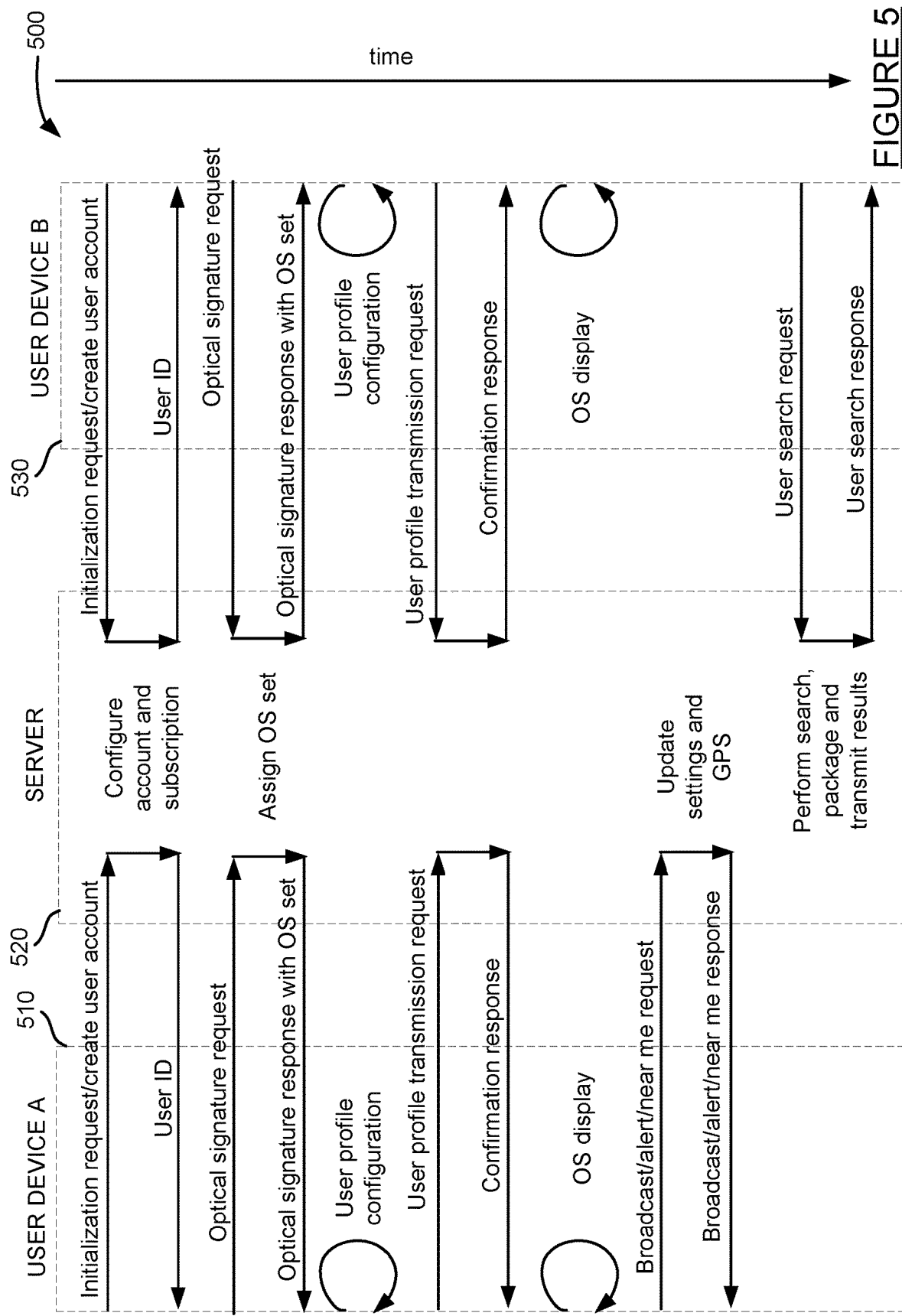
FIG. 5 illustrates a diagram of selected optical signature system operations over time.

FIG. 5 illustrates a diagram of selected optical signature system operations over time. FIG. 500 of FIG. 5 illustrates operations by a user device A, a server, and a user device B, in an exemplary temporal order. A user at user device A creates a user account, which initializes a request to the server to create an account. Upon receiving the request, the server configures the account, generates a subscription for the user, and returns a user ID to the user device A. An optical signature request may then be sent by user device A to the server. In response to the optical signature request, the server may transmit an optical signature set to user device A.

A user at user device A configures their user profile including their user characteristics and the interaction being sought and the characteristics of the user they are seeking to interact with. The user profile information is saved by the user and sent to the server which returns a confirmation response. The configuration of user profile information on device A will either cause device A to automatically select a single signature to display or provide the user with a limited number of optical signatures for selection of one optical signature to display.

A user of user device A may then provide input to broadcast, receive alerts, or transmit a request for users near the particular user or a geographic location. In response to user input, the user device A will send the appropriate message to the server, which then updates settings, GPS information and search parameters for the user of user device A and generates a response. The broadcast confirmation, alert, or near me response is transmitted from the server to user device A.

In some instances, all users will receive an identical optical signature set to ensure synchronized display of optical signatures across a plurality of devices with meanings of each optical signature known to all users of the system.

In some instances, a user of device A can set their geolocation to a place they will be in the future and set the time they will arrive at that location. User of device B and other users may set search parameters including a time frame and a geographic area in the future to search and receive a response from the server indicating which optical signature users plan to be at a location in the future.

In some instances, the server assigns the optical signature set in response to receiving one or more user characteristics from user device A. Upon receiving the user specific optical signature set from the server, an optical signature is selected from the set and displayed.

In some instances, a device may generate an optical signature utilizing data received from the server or from data provided by a local application.

In some instances, a device may display an optical signature stored or generated by an application on the device without obtaining an optical signature set from a server. User device B may initialize and create a user account, and in response a server may transmit a user ID to user device B. User device B may then request an optical signature set from the server and will receive an optical signature set in response. User B configures their user profile and an optical signature is displayed by user device B. User device B may then initiate a user search request. The user search request message is sent to the server, which then performs a search, packages the results, and transmits the search results. The search results are received by the user device B in a response.

Figure 6:
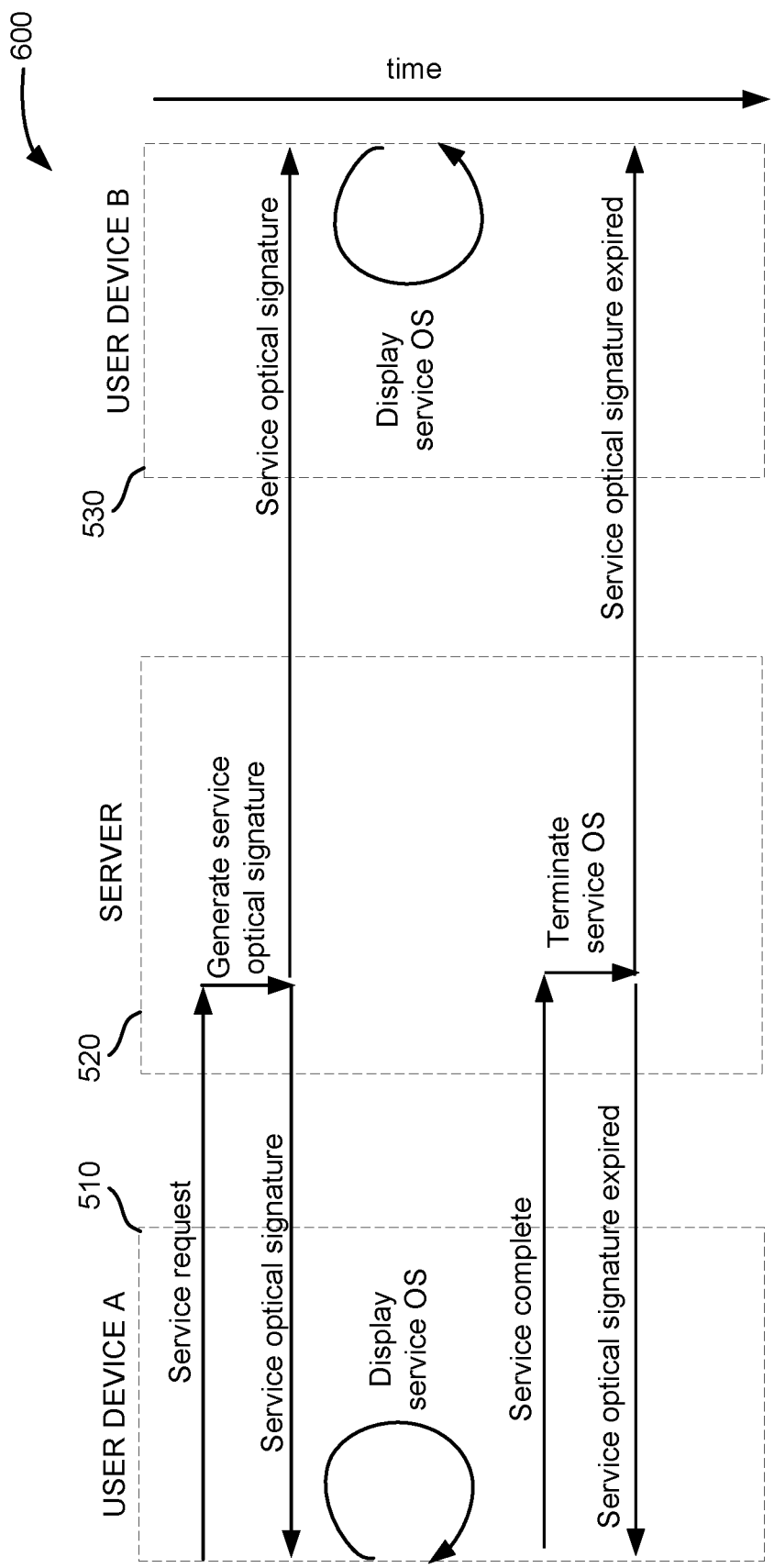
FIG. 6 illustrates a diagram of selected optical signature system operations for providing a service optical signature over time.

FIG. 6 illustrates a diagram of selected optical signature system operations for providing a service optical signature over time. In some instances, rather than configuring an optical signature from a received optical signature set, the user may request a service, which initiates identical optical signatures to be sent to both the user and a service provider. As shown in FIG. 6, a service request is sent from user device A to the server, which then generates a service optical signature. The service optical signature is transmitted to both user device A and user device B, which is associated with a service provider. The service optical signatures are displayed by both the user device A and the service provider associated with user device B. When the user and service provider come in contact as the services are provided, they may show each other the user devices to compare and confirm they have the same optical signature. Once the service is complete, the user (or service provider) may provide input indicating the completion of the service, which then sends a service complete message to the server. The server then terminates the service optical signature, and transmits service optical signature expiration messages to both user device a and the service providers user device B.

Figure 7:
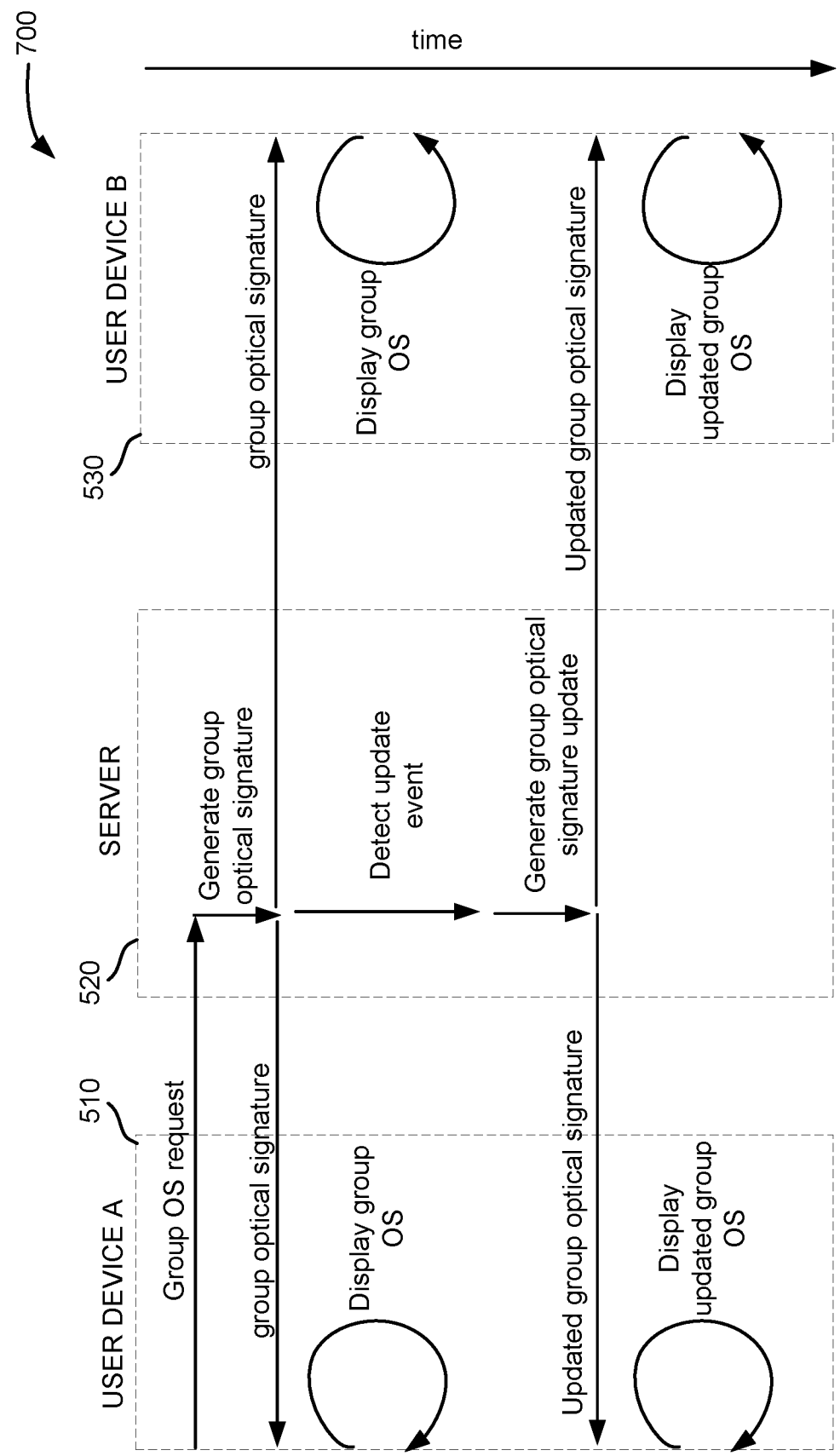
FIG. 7 illustrates a diagram of selected optical signature system operations for a group optical signature over time.

FIG. 7 illustrates a diagram of selected optical signature system operations for a group optical signature over time. In some instances, a group of people may receive optical signatures that update on a frequent basis. For example, a team of employees may receive optical signatures that update every minute to implement a level of security between the team. As shown in the operation diagram of FIG. 7, a group optical signature request may be sent to a server, which may then generate a group optical signature. The group optical signature may be sent to many devices, including user device A and user device B. The group optical signature may then be displayed by the user devices. An update event may be detected at the server, which may include an expiration of a period of time, such as one minute, a random event, or some other identifiable event. Upon detecting the update event, a group optical signature update may be generated by the server, and the updated group optical signature may be transmitted to the user devices. The devices may display the updated group optical signature upon receipt. The process may continue until the server determines that the group optical signature has been terminated, at which time a termination message will be sent to the user devices which have been receiving the group optical signatures.

Figure 8:
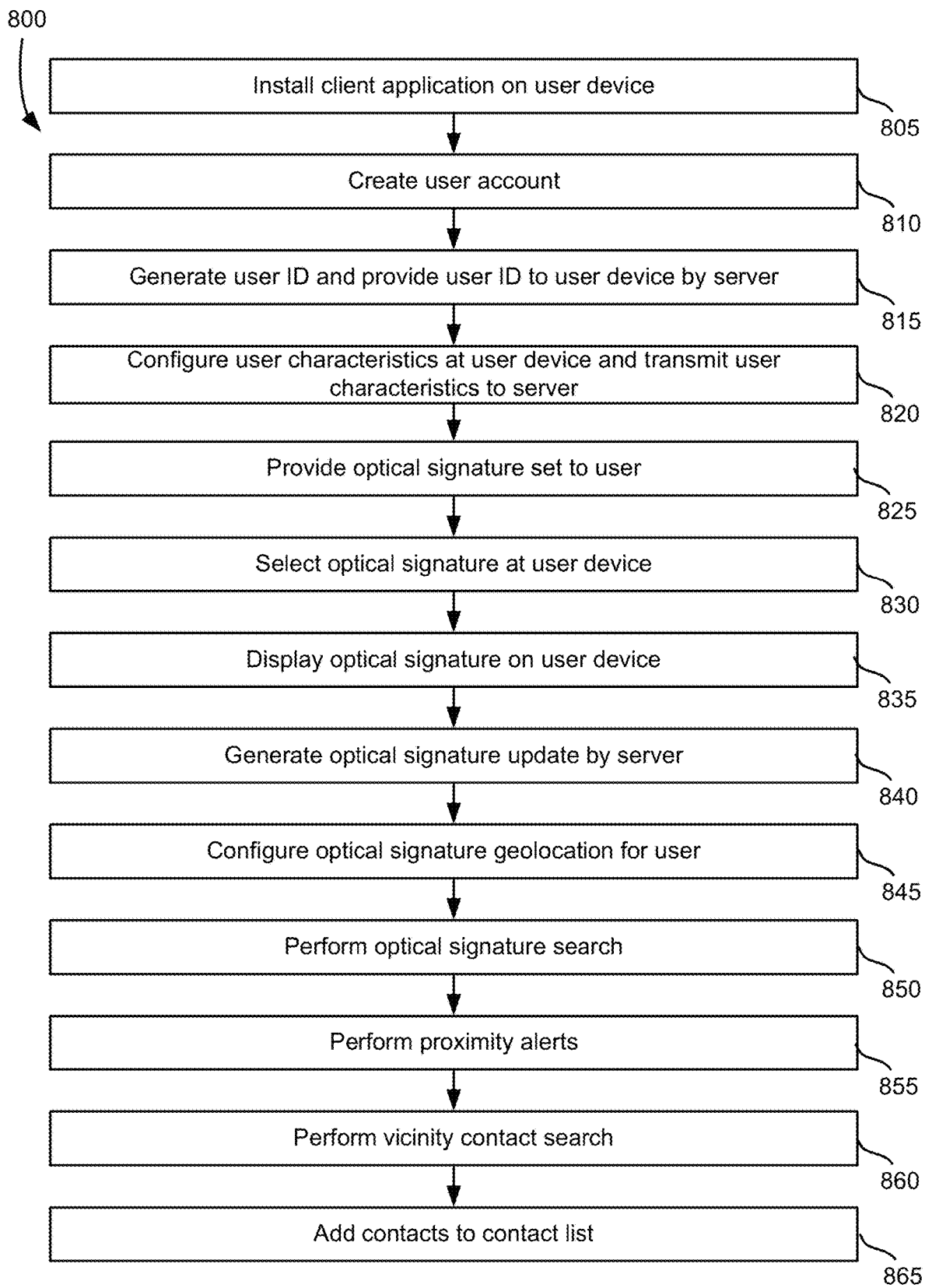
FIG. 8 illustrates a method for providing optical signatures.

FIG. 8 illustrates a method for providing optical signatures. The method of FIG. 8, in some instances, is performed by a server application and one or more client applications, such as for example those illustrated in the system of FIG. 2. A client application is installed on a user device at step 805. The client application may be, for example, a mobile application installed on a smart phone, smart watch, tablet computer or wearable device. The application may be downloaded from an app store or other service.

In some instances, the application may be installed on a mobile device of a user and transmit an optical signature set or a single optical signature to a wearable device for display.

A user account may be created at step 810. Creating a user account may include opening up the client application, providing account information such as a name, email, and password, and providing other data. In some instances, creating a user account may include providing some or all user characteristics for a user through an interface of the client application. The user account data received from a user and by the user device is transmitted to a server to create an account. The account may be stored in a user database, which may be referred to at subsequent logins by the user.

In response to creating a user account, the server may generate a user ID and provide the user ID to the user device at step 815. The user ID may be a globally unique ID assigned to the particular user. Upon user account creation, a server may provide an optical signature set to a user. Optical signature generation 840 may initially occur following account creation. The optical signature set provided by the server may be based on user characteristics or an identical optical signature set may be provided to all users of the same application to ensure synchronized display of optical signatures across a plurality of devices with meanings known to all users. More details for providing an optical signature set to a user are discussed with respect to the method of FIG. 9.

Upon receiving the user ID and/or optical signature set, a user may configure user characteristics at the user device at step 820. The user characteristics may be transmitted to a server and stored by the server. User characteristics may include interaction type desired, characteristics about a user related to the desired interaction type, user activity preferences, and other user characteristics. For example, user characteristics for a desired personal relationship may include relationship term and preferred gender. In another example, user characteristics for a desired business relationship may include funding desired and preferred position level.

In some instances, user characteristics may include a type of social or business interaction being sought by this user (chosen from list by user i.e. length of short term or long term relationship, exclusive vs non-exclusive), a user physical characteristics such as gender, age, height, body type, a user interests (e.g., activities a user likes to do such as hiking, volleyball, wine tasting), user personality traits such as determined, playful, or ambitious, user lifestyle preferences such as political leaning or drinking frequency, and saved requested user characteristics that this user is seeking from other users.

An optical signature received from a server as part of an optical signature set may be selected on a user device at step 830. The selection of an optical signature may occur automatically based on user characteristics set by the user or an optical signature may be selected by a user. Selection of an optical signature on a user device is discussed in more detail with respect to the method of FIG. 10.

An optical signature may be displayed on the user device at step 835. Display of an optical signature may include utilizing the entire display surface of a user device to show the optical signature. The optical signature may be provided continuously so that it can be viewed and interpreted by other users at any time, periodically, in response to receiving a signal such as a Bluetooth signal from devices associated with other optical signature system users, or in some other manner. In some instances, wearable devices will display a representation of the optical signature that remains recognizable to users of the application.

An optical signature update may be generated by a server at step 840. In some instances, a server may update optical signature sets based on some event. The event may be the expiration of a period of time, request by a user, or other events. More detail for generating an optical signature set update by server is discussed with respect to the method of FIG. 11.

An optical signature geolocation is configured for a user at step 845. In some instances, a user may opt to broadcast an optical signature so that the user may appear in searches by other users of the system. Configuring an optical signature geolocation for the user is discussed in more detail with respect to the method of FIG. 12.

An optical signature search may be performed at step 850. Performing a search may include providing user characteristics desired in the search results, geolocation data, and other data. Performing an optical signature search is discussed in more detail with respect to the method of FIG. 13A.

Proximity alerts may be configured at step 855. A proximity alert may notify the user when another user that matches the user's desired user characteristics is in the user's proximity. Configuring and receiving proximity alerts is discussed with respect to the method of FIG. 14.

In some instances, a user may set and add contact setting such that users in the vicinity may add the user to their contacts. Similarly, a user may add other users as his or her contact if they have set a similar setting. A vicinity contact search can be performed at step 860. The contact list response from the server may include a photo and predicted interaction score for the nearby user. In some instances, a user can, such as via cellular phone calls or SMS messaging, to communicate with search result users prior to meeting in person. More details for performing a vicinity contact search are discussed with respect to the method of FIG. 15.

In some instances, a user may meet another user in person or communicate with the other user via the system prior to meeting and desire to add the other user as a contact to allow future communication, meetings or other functionality. When adding a contact, the local device may retrieve a list with photos of nearby users to facilitate selection and addition of the correct user to a contact list at step 865. More details for adding contacts to a contact list are discussed with respect to the method of FIG. 16.

Figure 9:
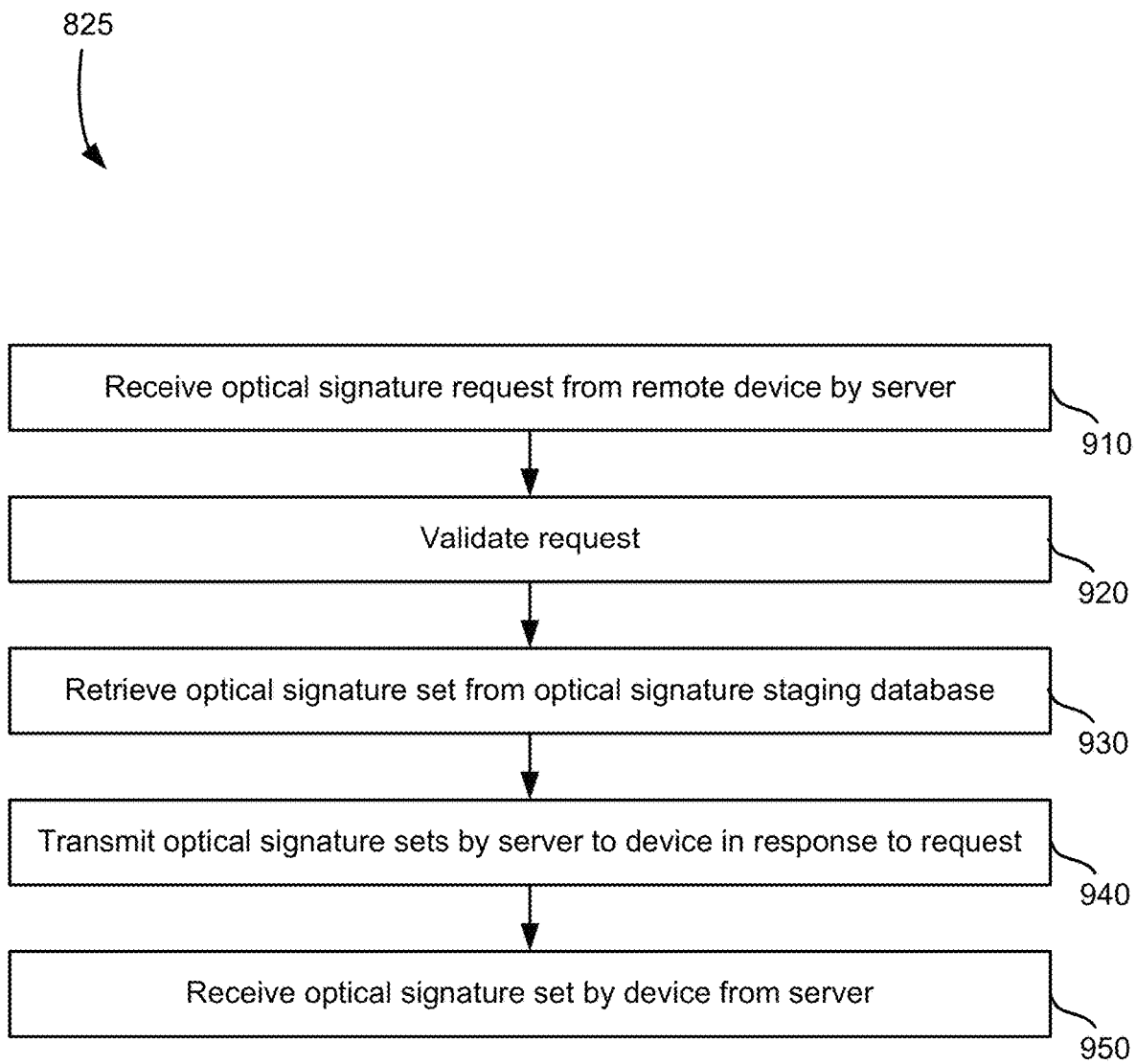
FIG. 9 illustrates a method for providing an optical signature set to a user.

FIG. 9 illustrates a method for providing an optical signature set to a user. The method of FIG. 9 provides more detail for step 825 of the method of FIG. 8. First, an optical signature request is received from a remote device by a server at step 910.

The request may be validated at step 920. In some instances, validating a request may include confirming a user ID and current subscription to the optical signature system, as well as user login credentials. If the request is not validated, an error message may be returned to the requesting user device.

Upon validating the request, an optical signature set is retrieved from the optical signature staging database at step 930. The retrieved optical signature set may correspond to the application requesting the set. An identical optical signature sets may be provided to all users of a specific application. For example, a user device may send an optical signature request for an optical signature for a specific application. In this case, the server may retrieve an optical signature set from the staging database that was generated for a specific application present on a plurality of devices or retrieve an optical signature set for an interaction category like relationships. The retrieved optical signature set is transmitted by the server to the requesting user device in response to the request at step 940. The optical signature set is an received by the device from the server at step 950.

In some instances, the server may generate optical signatures and optical signature sets at different times (e.g., step 840). Generating an optical signature set may include generating one or more optical signatures to include in the optical signature set. Each optical signature may be generated by the server using optical signature components, wherein each component may represent a particular meaning. The meanings of the signature components combined into one signature may provide the overall meaning of the signature. The particular meaning can include a relationship type or desired characteristic in a user for which interaction is sought. In some instances, an optical signature is not made up of components and has a meaning that applies to the optical signature as a single entity.

Figure 10:
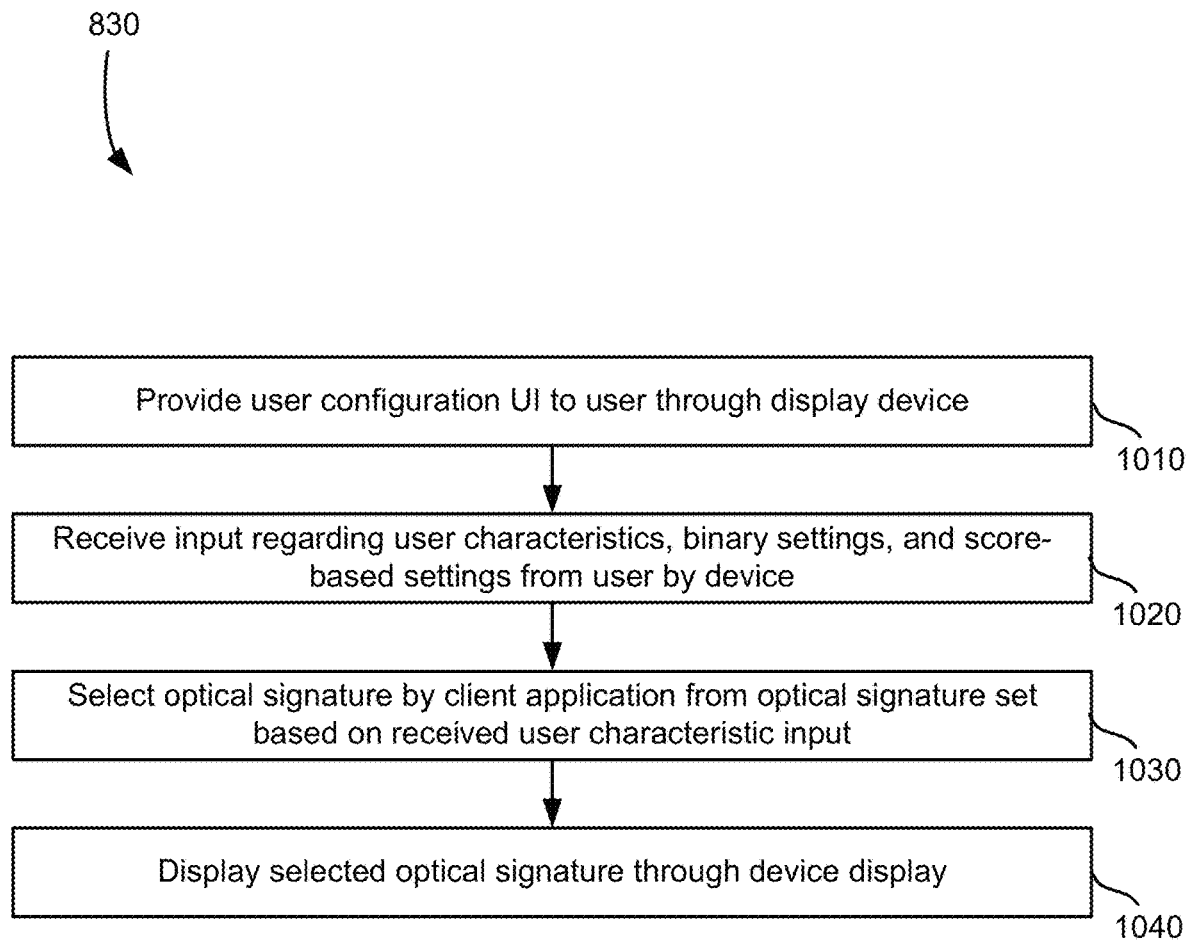
FIG. 10 illustrates a method for configuring optical signatures on a user device.

FIG. 10 illustrates a method for selecting an optical signature from an optical signature set on a user device. The method of FIG. 10 provides more detail for step 830 of the method of FIG. 8. First, a user configuration interface is provided to a user through the display device at step 1010. Input regarding user characteristics and interaction type being sought is received from the user at step 1020. During server-based searches, individual user characteristics elements will be categorized as binary settings and score-based settings by the search algorithm.

After the user configuration has been provide an optical signature is automatically selected from the optical signature set based on the received user characteristic input or used present a limited number of signatures to the user for selection of optical signature that will be displayed on the device at step 1030. For example, if a user provides input to the user device that they are seeking a long-term relationship with a female the system may automatically select the signature with that meaning using the optical signature meaning index at step 1030. In some instances, user configuration input will limit applicable optical signatures to a subset of the total number of signatures in the optical signature set and the user may make a final optical signature selection. The selected optical signature is then displayed through the user device display at step 1040.

Figure 11:
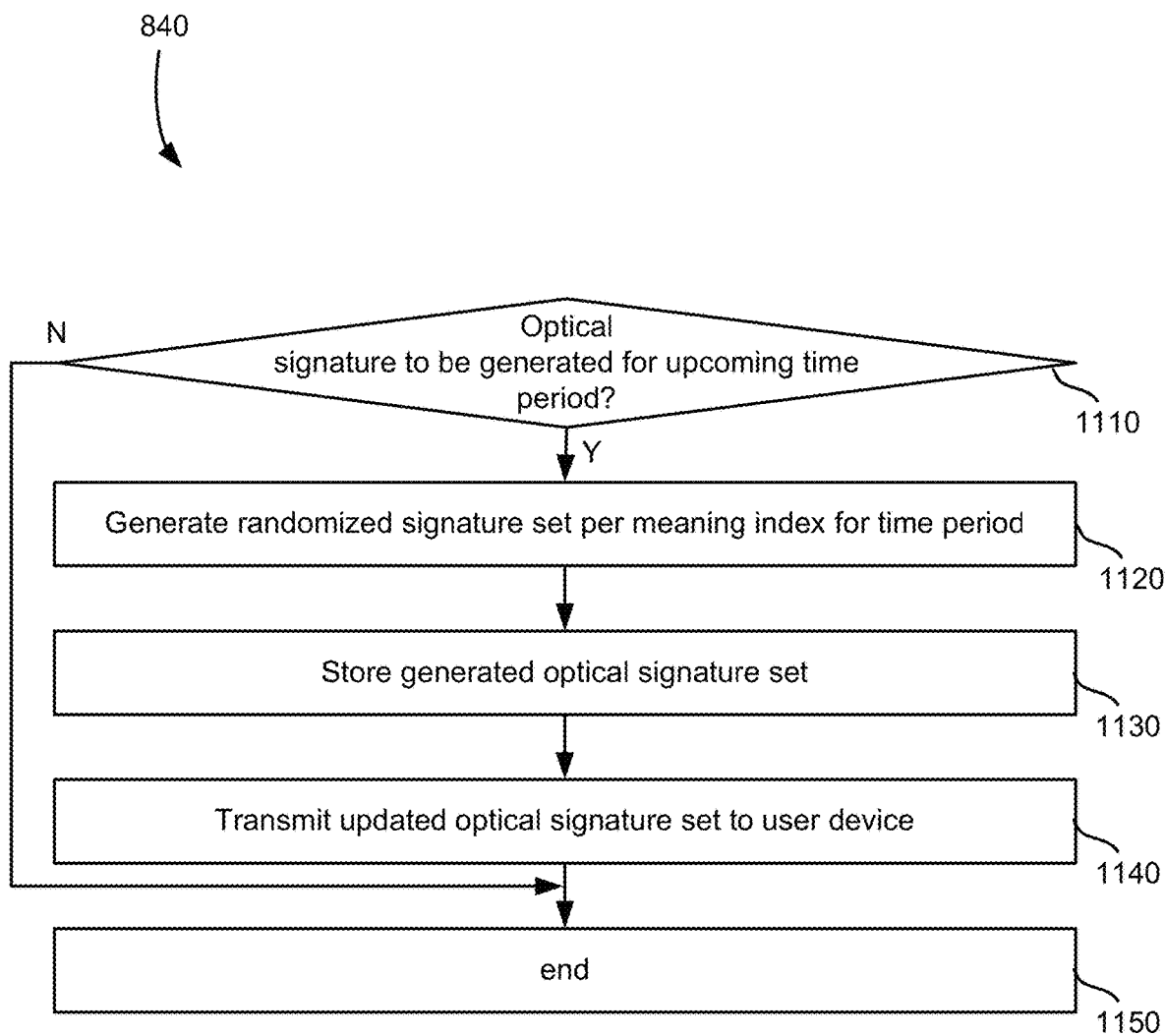
FIG. 11 illustrates a method for generating an optical signature update by a server.

FIG. 11 illustrates a method for generating an optical signature update by a server. The method of FIG. 11 provides more detail of step 840 of the method of FIG. 8. First, a determination is made as to whether an optical signature set should be generated for an upcoming time period at step 1010. If no optical signature is to be generated, the method of FIG. 11 ends at step 1150. If an optical signature set is to be generated, a signature set is generated per the meaning index for a particular time at step 1120. In some instances, an optical signature set may be randomly generated. In some instances, the optical signature set may be generated based on user input, a prescribed pattern, other event or provided server configuration. In some instances, the meaning of some components of an optical signature may be randomized when an optical signature set is generated. The benefit of changing optical signature sets is that it contributes to keeping the meaning of an optical signature set anonymous to nonusers and prevents copying or theft.

The generated optical signature set is then stored at step 1130. The updated optical signature set may then be transmitted to a user device at step 1140. In some instances, the steps of generating optical signature sets and transmitting the updated signature set to the user device may be repeated periodically, or in response to some event. After transmitting the updated optical signature, the method of FIG. 11 ends at step 1150.

Figure 12:
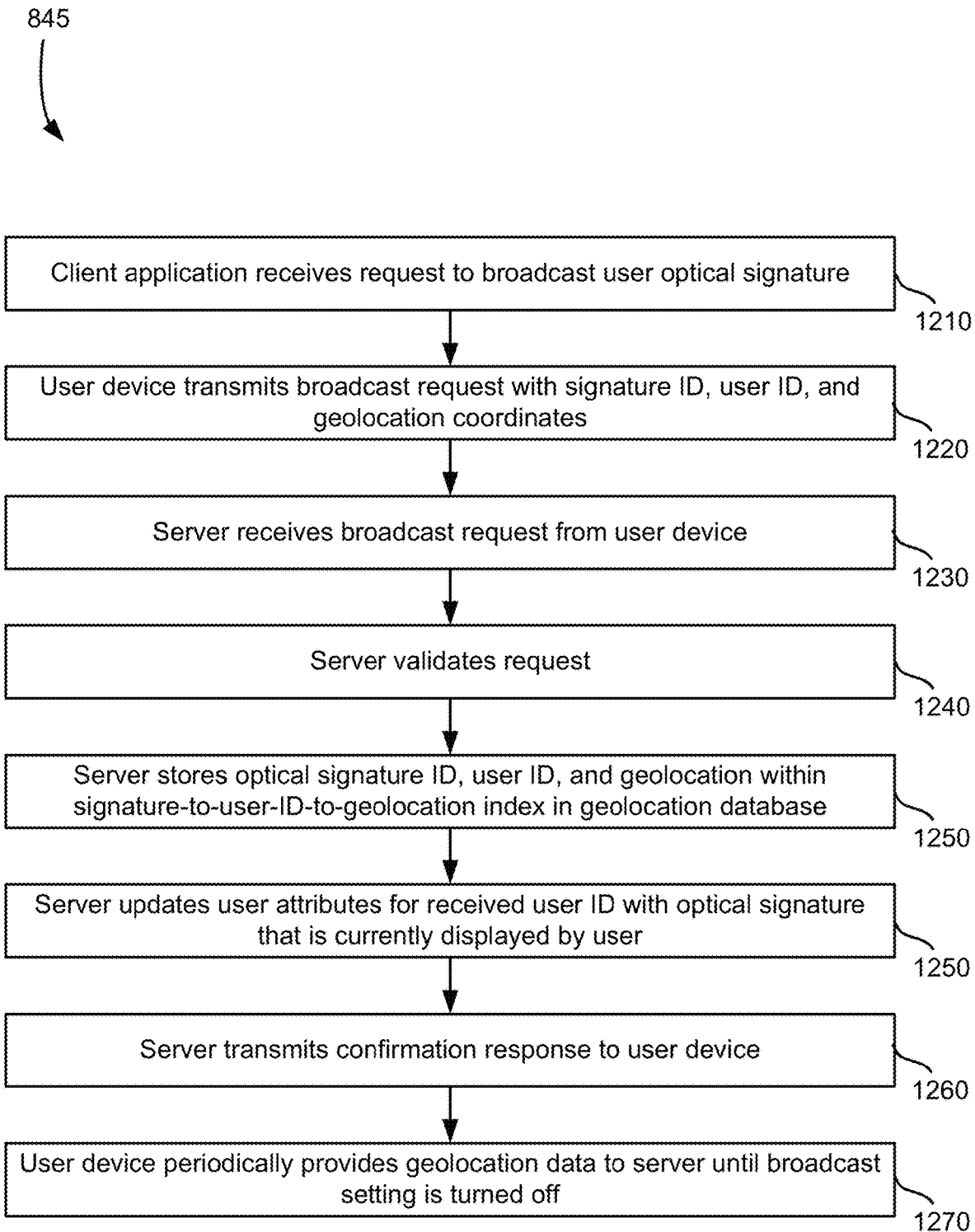
FIG. 12 illustrates a method for configuring an optical signature geolocation.

FIG. 12 illustrates a method for configuring an optical signature geolocation. The method of FIG. 12 provides more detail for step 845 the method of FIG. 8. A client application can receive a request to broadcast a user's optical signature at step 1210. The request may be received through user interface provided by the optical signature client application. The user device may then transmit a broadcast request to the server at step 1220. The broadcast request may include an optical signature ID, user ID, and geolocation coordinates associated with the current location of the user. The server receives the broadcast request from the user device at step 1230. The server validates the request at step 1240 and then stores the optical signature ID, user ID, and geolocation data at step 1250. The received data may be stored within a user to optical signature to geolocation index in a geolocation database. The server may update user attributes for the received user ID with the optical signature that is currently displayed by the user at step 1250. The server may then transmit a confirmation response to the user device at step 1260. The user device may periodically provide geolocation and displayed signature updates to the server until a broadcast setting is turned off at step 1270. Updated user configurations will also be transmitted to the server when made by the user.

Figure 13A:
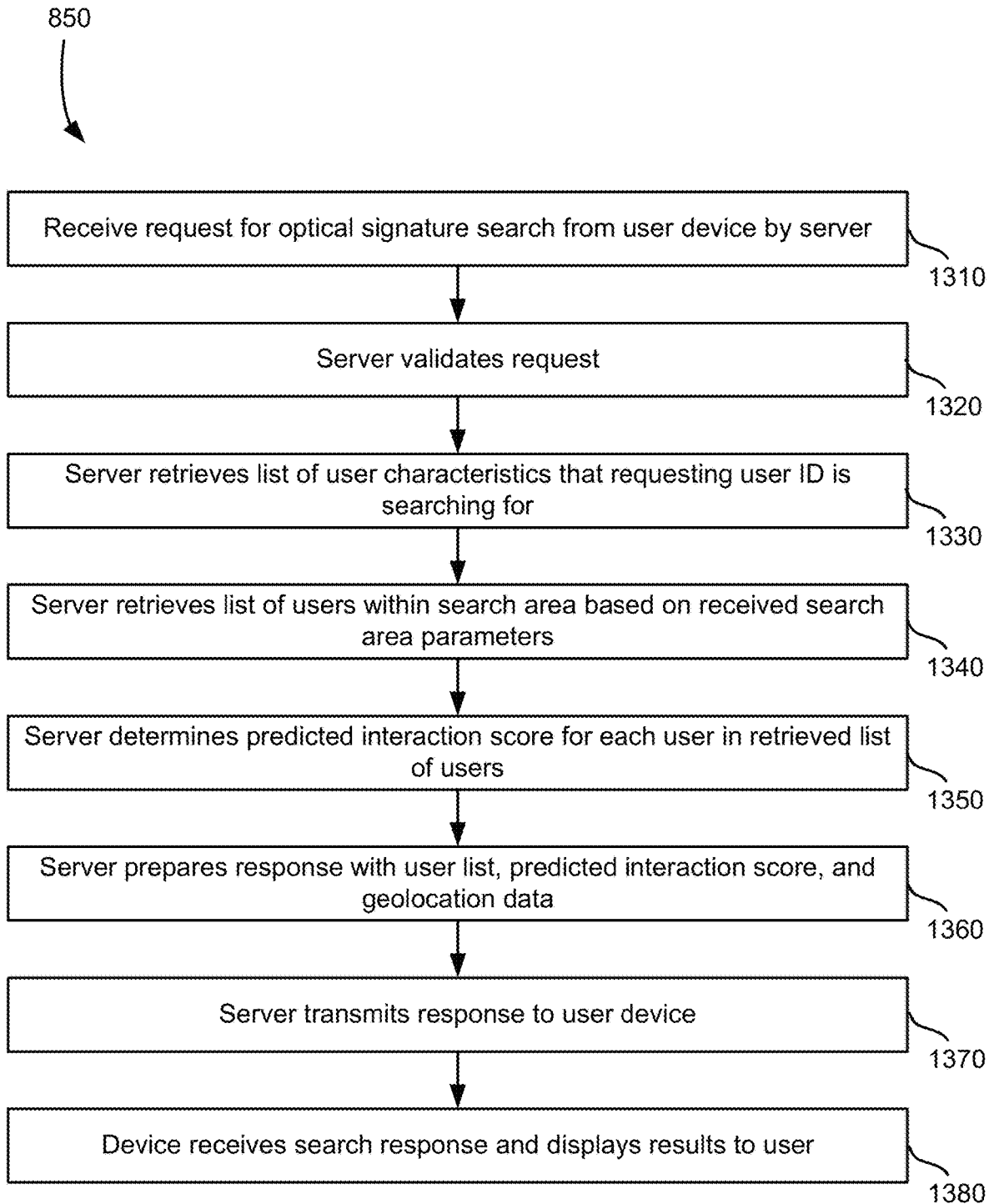
FIG. 13A illustrates a method for performing an optical signature search.

FIG. 13A illustrates a method for performing an optical signature search. The method of FIG. 13 a provides more detail for step 850 of the method of FIG. 8. A request for an optical signature search is received from a user device by server at step 1310. The server validates the request at step 1320, then retrieves a list of user characteristics that the requesting user ID is searching for at step 1330. In some instances, a user device will transmit updated search parameters with the search request. The server retrieves a list of users within a search area based on the received search area parameters at step 1340. The server determines a predicted interaction score for each user in the retrieved list of users at step 1350. Determining a predicted interaction score may involve identifying users that are predicted to have a positive interaction with the requesting user based on binary characteristics that, in some instances, must be met and scoring characteristics. More details for determining a predicted interaction score for users and generating a results pool is discussed with respect to the method of FIG. 13 B.

The server prepares a response that may include a user list or search signature map with optical signature user locations, predicted interaction score, and geolocation data for each user in the list at step 1360. The prepared response is transmitted to the user device at step 1370. The device receives the response and displays the results to a user through the user device display at step 1380. In some instances, locations with optical signature users inside or nearby are highlighted with a list or display of users inside the establishment provided.

Figure 13B:
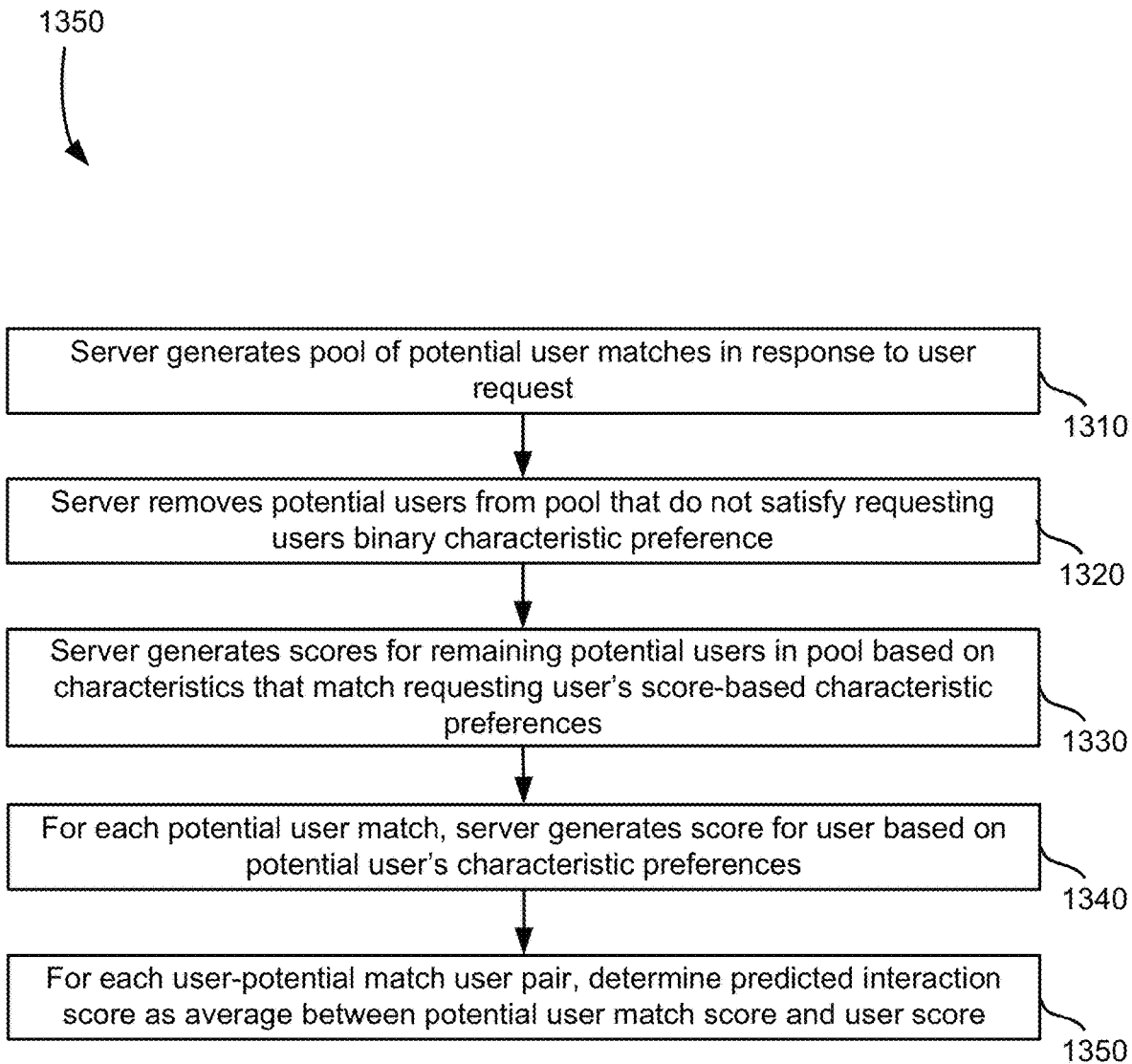
FIG. 13B illustrates a method for determining a predicted interaction score.

FIG. 13B illustrates a method for determining a predicted interaction score. The method of FIG. 13B provides more detail for step 1350 of the method of FIG. 13A. First, a server generates a pool of potential user matches in response to the user request at step 1310. In some instances, the potential user matches within the pool are selected based on the geographic location of the users. For example, users within a default area of 1 mile of the user or of a location specified by a user may be added to the results pool of potential users.

Next, the server removes potential users from the pool that do not satisfy the requesting users binary characteristic preference at step 1320. In some instances, a user may have two types of characteristic preferences: binary and scoring. A binary characteristic preference can, in some instances, be implemented as a must-have criterion that must be met, such as for example displaying a specific optical signature. Users are eliminated from the pool if a binary characteristic value does not match the search value. A scoring characteristic is one in which a weighted value is generated based on whether a potential user match has a matching characteristic value. In some instances, system configuration settings determine which characteristics are binary or scored and provides the weighting for scored characteristics.

After removing potential users based on the binary characteristic preferences of the requesting user, the server can generate predicted interaction scores for the remaining potential users in the pool at step 1330. The interaction scores are generated based on characteristics that fulfil the requesting users score based characteristic preferences. For example, if a requesting user likes sports, and in particular volleyball, a user pool result that like sports may receive five points while another user result that like sports and volleyball may receive 10 points.

For each potential user search result, the server generates a reverse score for the searching user based on a potential result user's characteristic preferences at step 1340. Thus, in addition to determining if the potential user is a good match for the requesting user, a score is calculated to determine if the searching user also meets the interaction criteria provided by the potential user in the pool based on the potential users characteristic settings. For each user and potential results pool user pair, the predicted interaction score is determined as the average between the searching user to potential results user score and the reverse score which calculates the potential results user and the searching user score at step 1350. Hence, the predicted interaction scores calculated in both ways between the user and the potential user results are averaged to determine the overall predicted interaction score between the user and the potential user. Optical signature user search response lists may be sorted to rank the highest predicted interaction score users at the top of the list or to filter out users with scores below a threshold.

Figure 14:
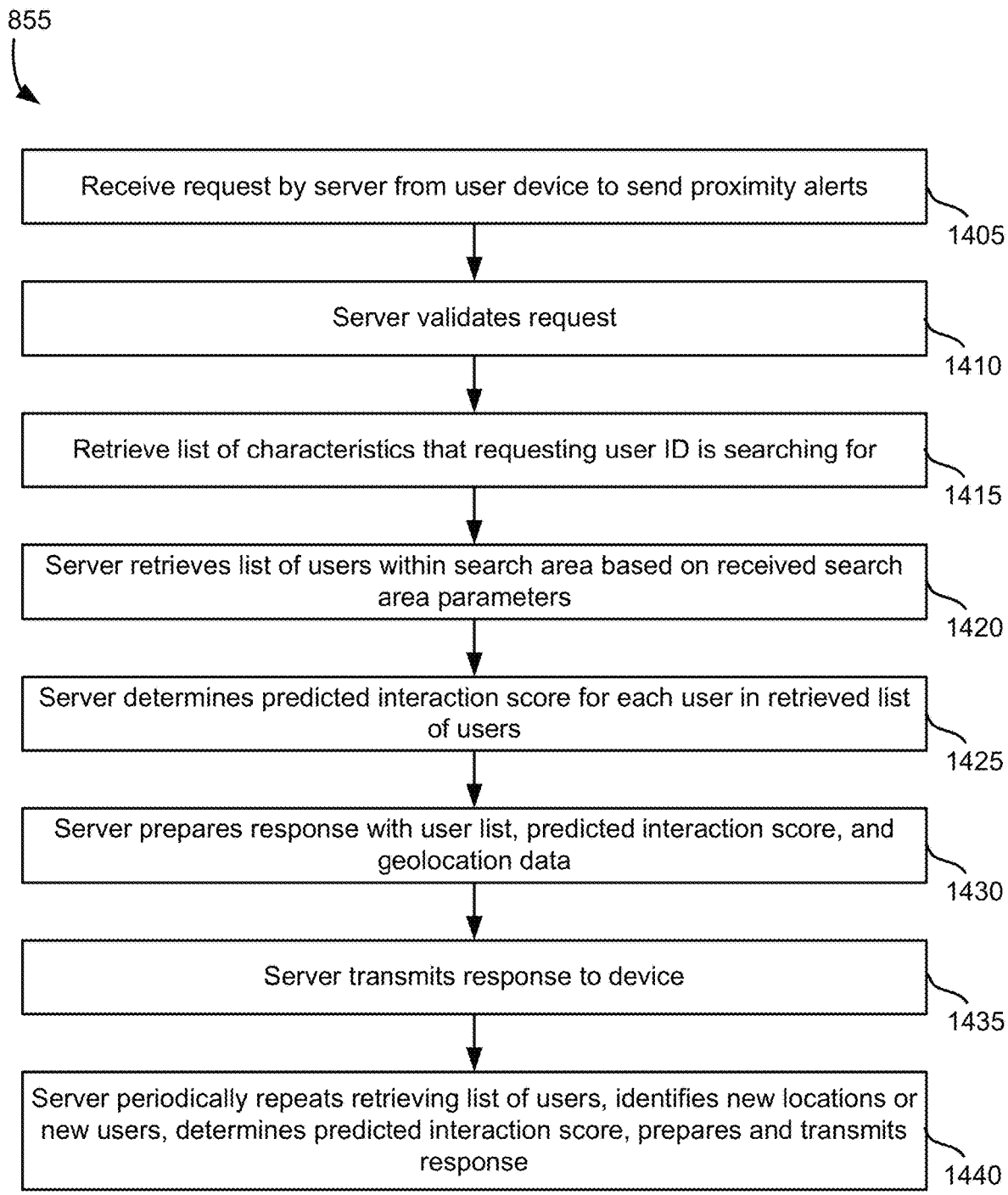
FIG. 14 illustrates a method for performing proximity alerts.

FIG. 14 illustrates a method for performing proximity alerts. The method of FIG. 14 provides more detail for step 855 of the method of FIG. 8. The request received by the server from the user device activates proximity alerts at step 1405. The request may include a search center point and a search radius for which to search for users to trigger a proximity alert. In some instances, the search center point is the user device geolocation coordinates. In some instances, the search center point is a location set by the user. In some instances, a user can set a proximity alert on a location and a future time window. If a second user plans to be at or near the location in the future time window a proximity alert will occur.

The server validates request at step 1410, and the list of characteristics that the requesting user ID is searching for is retrieved at step 1415 or search parameters provided with the search request may be used. The server retrieves a list of users within the search area based on the received search area parameters at step 1420. Server determines predicted interaction score for each user in a retrieved list of users within the desired search area at step 1425. The server then prepares a response with the user lists or search signature map, predicted interaction score, and geolocation data at step 1430. The server transmits the response to the user device at step 1435. The server may periodically repeat retrieving the list of users, identify new locations or users, determining predicted interaction scores and preparing and transmitting the response at step 1440.

Figure 15:
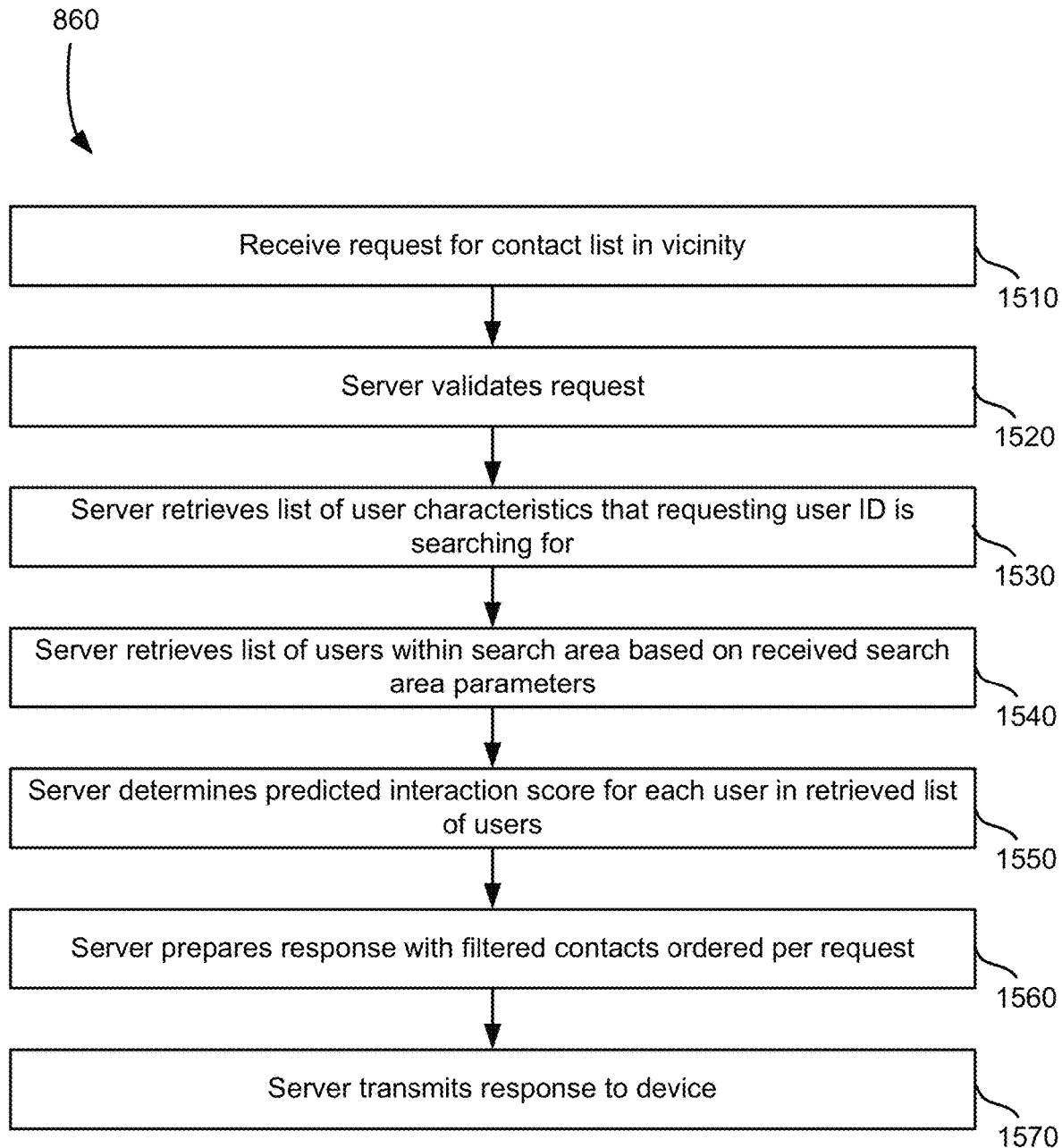
FIG. 15 illustrates a method for performing a vicinity contacts search.

FIG. 15 illustrates a method for performing a vicinity contacts search. The method of FIG. 15 provides more detail for step 860 the method of FIG. 8. A request is received for a contact list in the vicinity of the user at step 1510. The server validates the request at step 1520. The server retrieves a list of user characteristics that the requesting user ID is searching for at step 1530. The server then retrieves a list of users within a search area based on the received search area parameters at step 1540. Server determines the predicted interaction score for each user in the retrieved list of users at step 1550. The server prepares response with filtered contacts ordered per the request at step 1560. Server transmits response to the device at step 1570.

In some instances, the client application will notify the user of events that will bring together an increased concentration of system users to increase the frequency of interactions. In some instances, users will be able to post events to other users using the client application. At these events or in day to day use, the contact list response from the server may be ranked in order allowing the user to identify nearby users with the highest predicted interaction scores.

Figure 16:
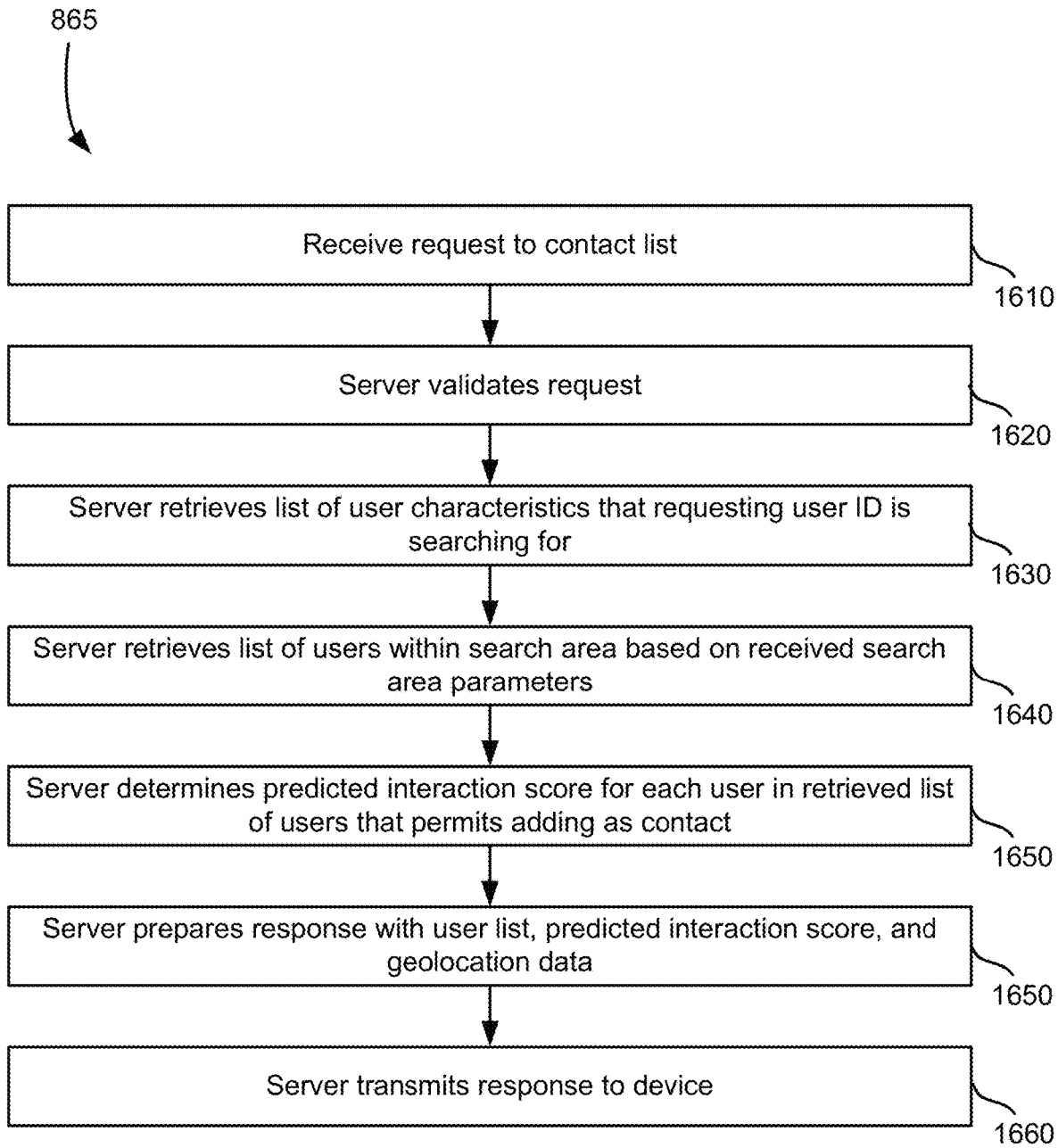
FIG. 16 illustrates a method for adding contacts to a contact list.

FIG. 16 illustrates a method for adding contacts to a contact list. The method of FIG. 16 provides more detail for step 865 of the method of FIG. 8. The request is received for a contact list at step 1610. The server validates request at step 1620. The server retrieves a list of user characteristics that the requesting user ID is searching for at step 1630. The server then retrieves a list of users within the search area based on the received search area parameters at step 1640. Server determines a predicted interaction score for each user in the retrieved list of users that permits adding as a contact at step 1650. The server then prepares a response with the user lists, predicted interaction score, and geolocation data at step 1650. The server then transmits the response with the contact data to the user device at step 1660.

Figure 17:
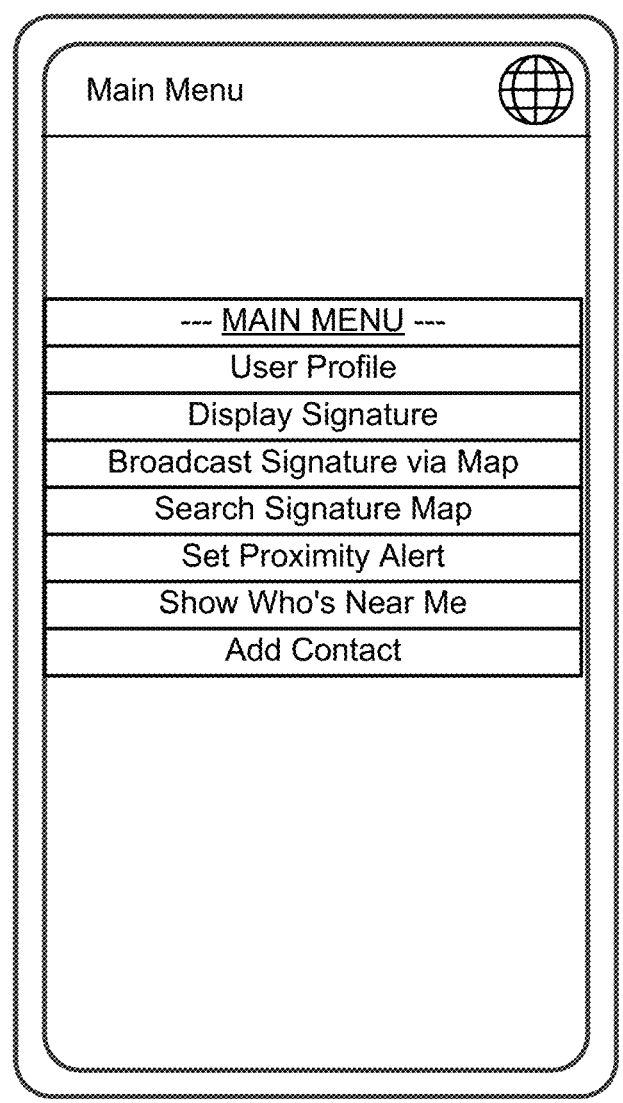
FIG. 17 illustrates an exemplary main menu user interface provided by an optical signature client application.

FIG. 17 illustrates an exemplary main menu user interface provided by an optical signature client application. The main menu may be provided upon startup of the client application on a user device. The user interface includes a main menu heading with selectable icons of user profile, display signature, broadcast signature via map, search signature map, set proximity alert, show who is near me, and add contact. Upon selecting one of the selectable icons, user may proceed to perform operations associated with the particular selectable icon.

FIGS. 18-20 illustrate an optical signature meaning index. The optical signature meaning index specifies optical signature IDs, a reference to the optical signature data that defines the visual output of the signature, and the meaning or meanings that are indexed to a specific optical signature, or in some instances, a reference to the signature meaning. The optical signature ID provides a reference to information associated with a specific optical signature. In some instances, only the optical signature ID and meanings or references to the meanings are provided in the optical signature meaning index.

Meanings indexed to an optical signature ID may be provided by a reference to the meaning information or may be present in the index. In this example, display of optical signature ID A-1, means that the user displaying this optical signature is looking for a long-term exclusive relationship. Desired gender is not specified. Display of optical signature ID B-1, means that the displaying user is looking for a long-term exclusive relationship with a female.

FIG. 21 illustrates a user to optical signature to geolocation index. The index 2100 of FIG. 21 includes the optical signature ID, the user ID and geolocation information of the user, or in some instances, a reference to a user's geolocation information. The optical signature ID provides a reference to information associated with a specific optical signature including meanings. The user ID may be a globally unique identifier that provides a reference to information associated with a specific user, including the interaction type desired by the user. Geolocation information may be provided in latitude and longitude coordinates or other formats. In some instances, the geolocation may be the current coordinates of the user device or a location that the user desires to search or create a proximity alert for. In some instances, the geolocation information may include the center of a search area and radius to search or other geographic or search definition information. The index 2100 may be maintained at the server application or GPS location database and is populated by the client application transmitting to the server the displayed optical signature ID, user ID and geolocation when the user initially activates the broadcast signature to map functionality. The user device transmits the user to optical signature to geolocation index data to the server at a regular interval until the broadcast signature to map is turned off.

Figure 22:
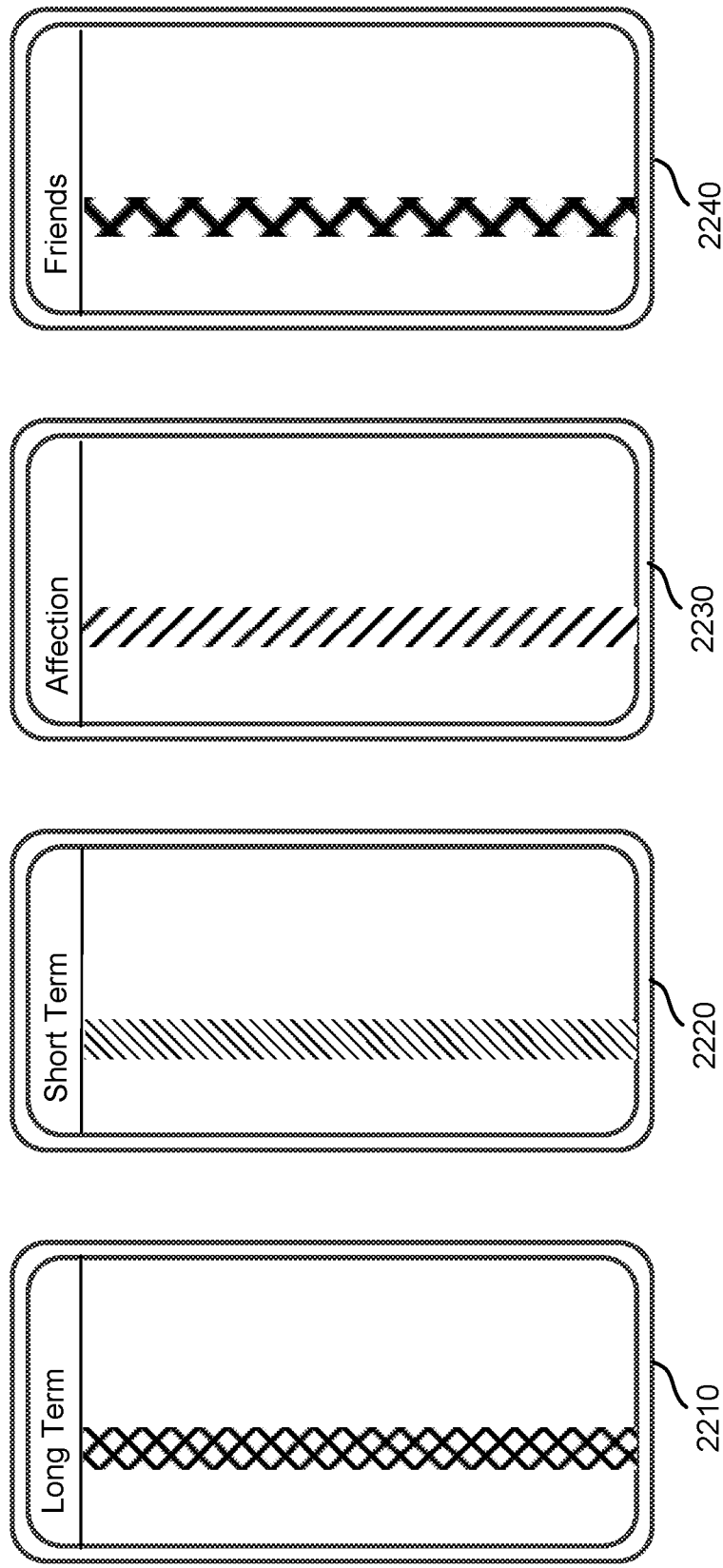
FIG. 22 illustrates examples of optical signatures related to relationships.

FIG. 22 illustrates examples of optical signatures related to relationships. The user interface displayed in optical signature 2210 illustrates a first optical signature associated with a preference for an interaction type of long-term relationship. The user interface displayed in optical signature 2220 illustrates a first optical signature associated with a preference for a short-term relationship interaction type. The user interface displayed in optical signature 2230 illustrates a first optical signature associated with a preference for an affectionate relationship interaction type. The user interface displayed in optical signature 2240 illustrates a first optical signature associated with a friendship relationship preference. The single rectangle displayed for each component in optical signatures 2210-2240 indicate a preference for an exclusive relationship.

Figure 23:
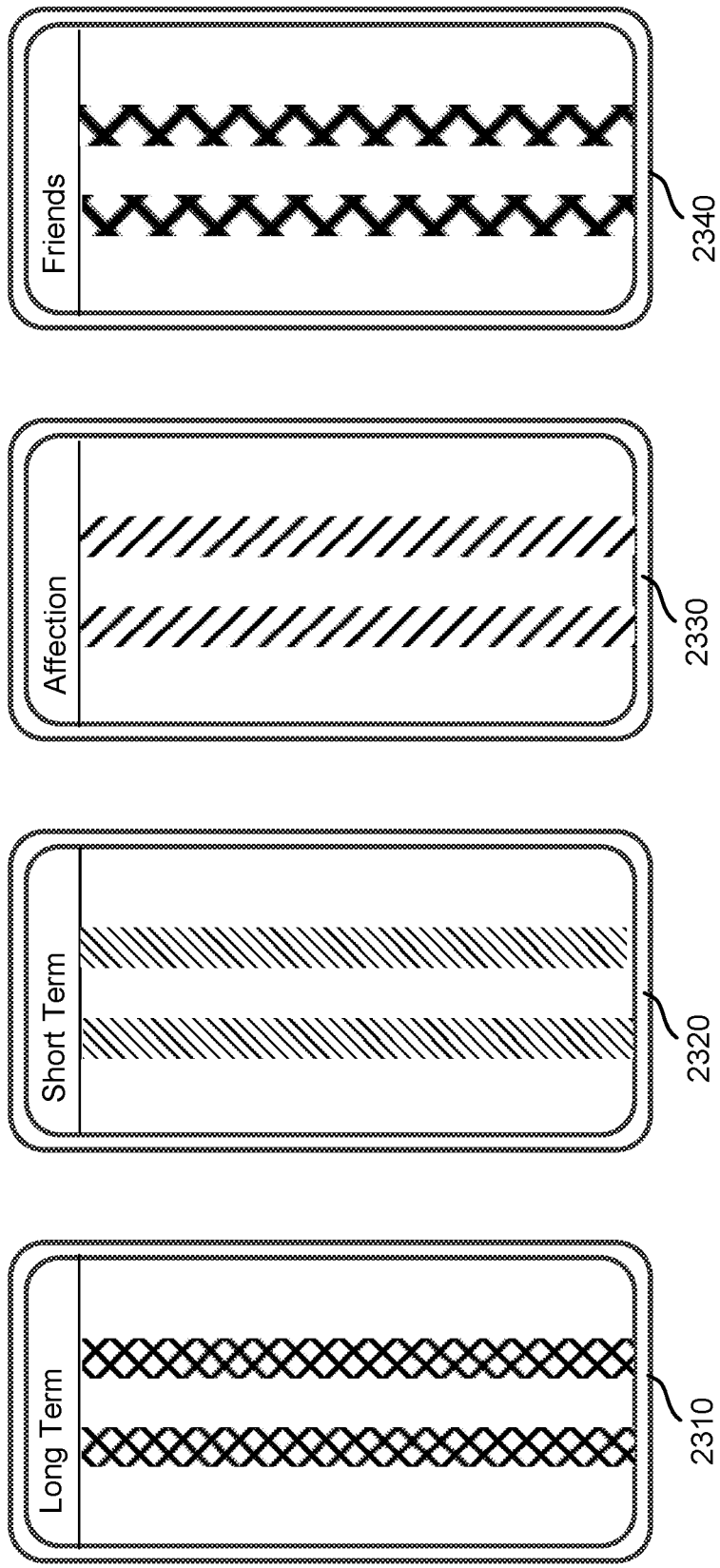
FIG. 23 illustrates examples of optical signatures related to nonexclusive relationships.

FIG. 23 illustrates examples of optical signatures related to nonexclusive relationship interaction types. Optical signatures 2310-2340 of FIG. 23 display similar relationship preferences as those discussed with respect to FIG. 24, but with a double rectangle format indicating an interaction type of preference of nonexclusive relationship.

Figure 24:
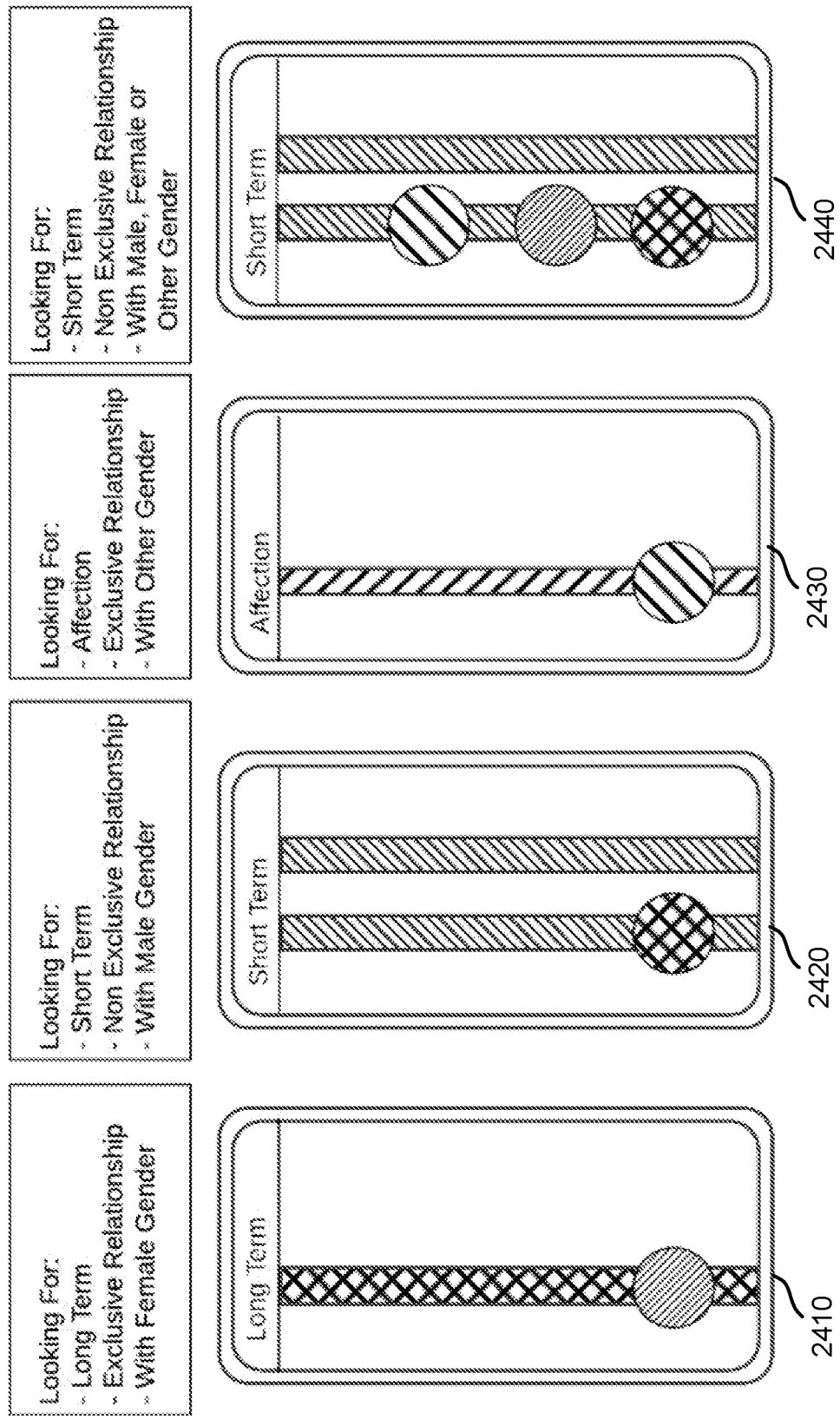
FIG. 24 illustrates examples of optical signatures.

FIG. 24 illustrates examples of optical signatures. FIG. 24 includes optical signatures 2410, 2420, 2430, and 2440. Optical signature 2410, comprised of a rectangle and a circle, indicates a user is looking for an interaction type of long-term exclusive relationship with a female. Optical signature 2420 with two rectangles and a circle in different colors indicates the user is looking for an interaction type of short-term nonexclusive relationship with a male. The optical signature 2430 having a single rectangle and circle indicates the user is looking for an interaction type of affection in an exclusive relationship with a gender of "other." Optical signature 2440 having two rectangles and three circles indicates that the user is looking for a short-term nonexclusive relationship with a male female or other gender.

FIG. 25 illustrates examples of optical signatures with signature meanings that are periodically randomized. As shown, the optical signatures associated with day one include rectangles having a first pattern or color. The corresponding optical signatures for day to include similarly shaped rectangles but with different patterns and/or colors. The optical signatures associated with day three also include a similar shape of a rectangle but again with different patterns or colors. Hence, the optical signature shape may be maintained over the course of several updates, with the colors or patterns within the shape being changed when the optical signature set is updated. The updated optical signature meaning index means that users of the client application will know the meanings of signatures while non-users may not which helps to preserve the confidentiality of user's interaction type preferences. In some instances, the shapes may be changed as well as some other aspect of the optical signature.

Figures 26A, 26B:
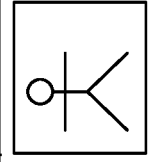
FIG. 26A illustrates an example of an optical signature client application user interface for updating user characteristics of the device user.
FIG. 26B illustrates an example of an optical signature client application user interface for specifying user characteristics desired in other users.

FIG. 26A illustrates an example of an optical signature client application user interface for updating user characteristics of the device user. The interface of FIG. 26A allows a user to provide characteristic information about the user him or herself. For example, the user characteristics about the user may include the username, gender, whether the user is interested in an exclusive relationship, the user's interests, such as waterskiing, microbrews, and volleyball, and the user's body type. User may also provide a picture, caption, and optionally other data.

FIG. 26B illustrates an example of an optical signature client application user interface for specifying user characteristics desired in other users. In the interface of FIG. 26B, the user may provide user characteristics that they are seeking than others. For example, the user may select user characteristics such as relationship type, gender, exclusivity, minimum age, maximum age, body type, interests that are must haves (e.g., binary characteristic preferences) and interests that are nice to have (scoring characteristic preferences).

Figure 27:
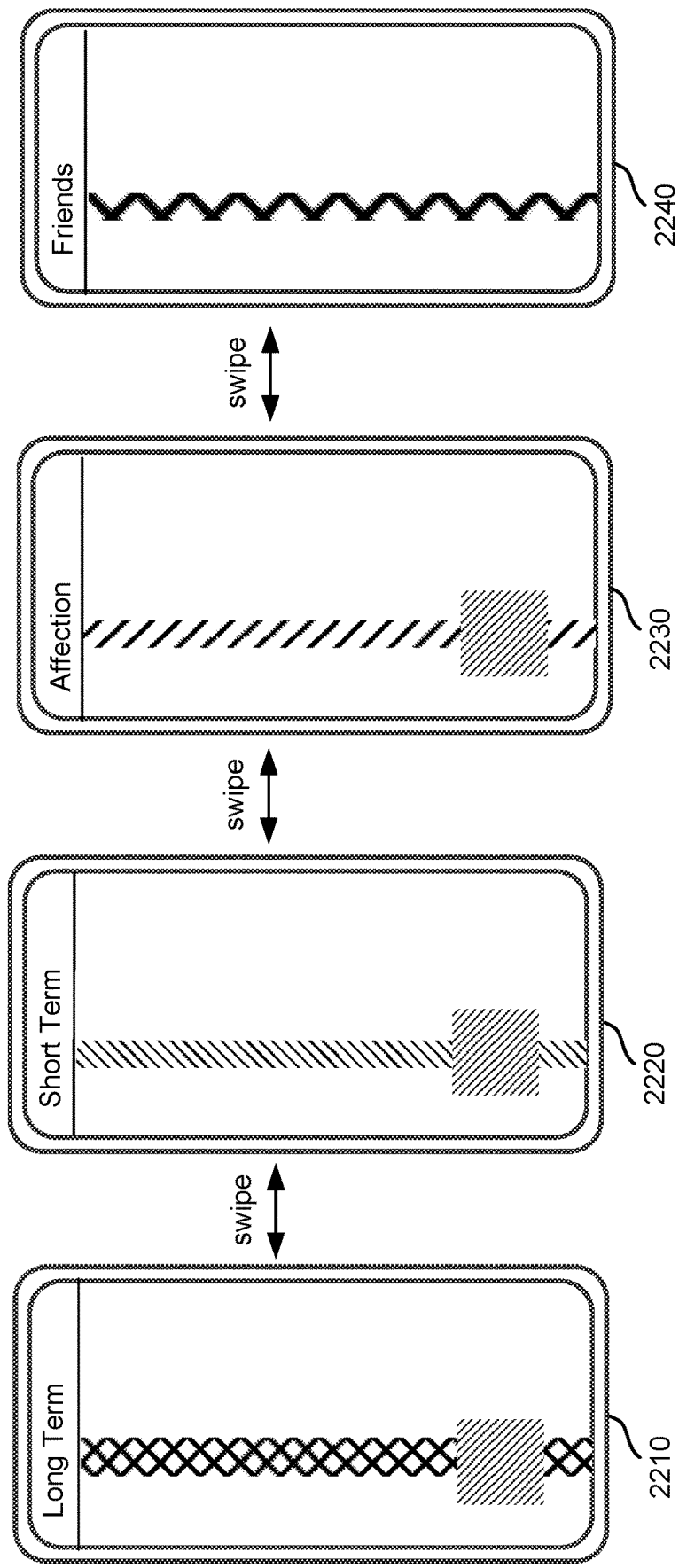
FIG. 27 illustrates an example of an optical signature client application user interface that a user can swipe between selections to select an optical signature for display.

FIG. 27 illustrates an example of an optical signature client application user interface that a user can swipe between selections to select an optical signature for display. In the user interfaces of FIG. 27, a user may swipe between a long-term relationship preference associated with the optical signature of interface 2210, short-term relationship preference with optical signature 2220, affectionate relationship preference with optical signature 2230, and friends only preference in optical signature 2240. A user setting the user characteristics of users they are seeking to interact with may trigger the automatic selection by the client application of a subset of the total number of optical signatures present in an optical signature set. In some instances, the user setting a preference to interact with the female gender while setting desired user characteristics would then only be presented with optical signatures seeking the female gender as the user makes the final selection of relationship type for the optical signature to display.

Figure 28A:
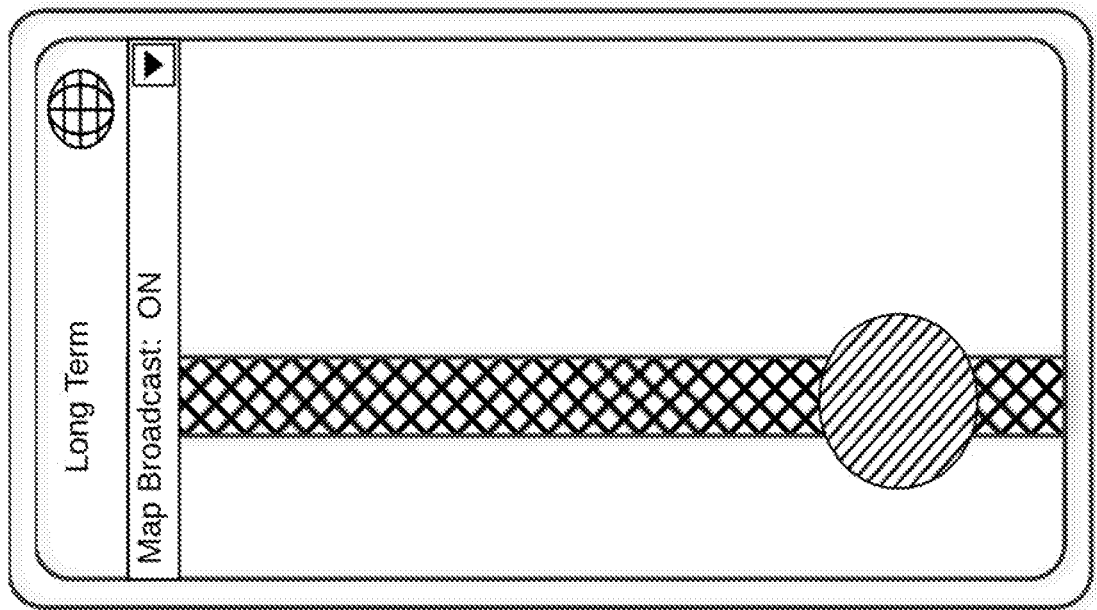
FIGS. 28A-B illustrate an example of optical signature client application user interfaces for configuring an optical signature map broadcast setting.
Figure 28B:
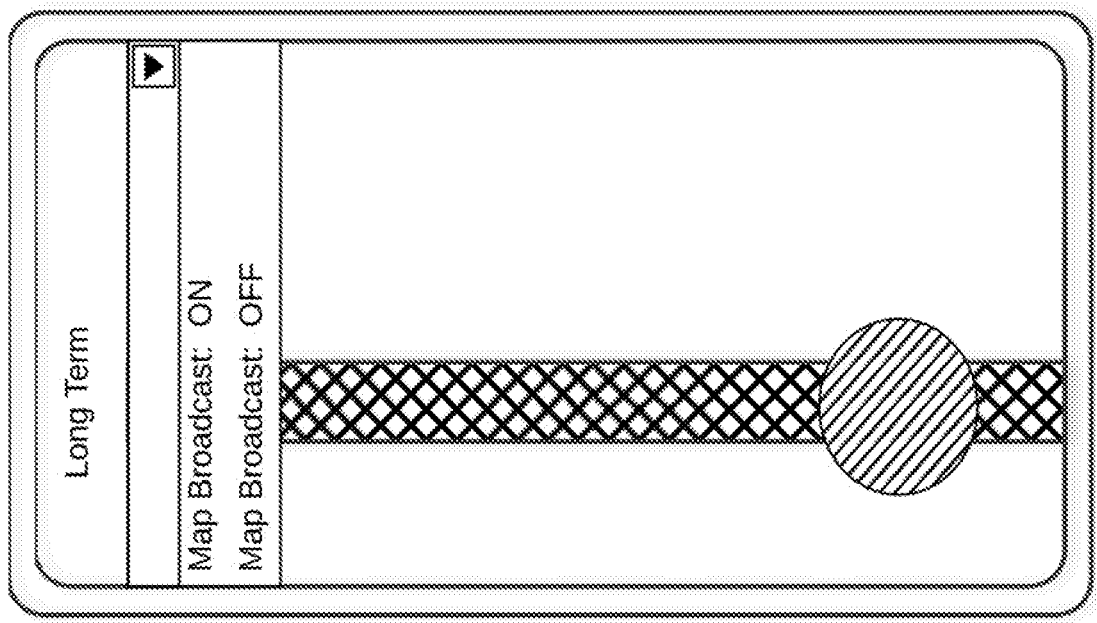

FIGS. 28A-B illustrate an example of optical signature client application user interfaces for configuring an optical signature map broadcast setting. In the interface of FIG. 28A, a user can configure optical signature broadcasting through a drop-down menu which allows a user to select optical signature map broadcasting to be on or off. In the interface of FIG. 28B, the user selected the option of turning an optical signature map broadcast setting to on. In response to setting the selection to be on, a message is sent from the particular user device to a server with a user ID, optical signature ID, and geolocation data. This information, along with user characteristics already stored at the server, is used to provide search responses to other users requesting a search for users within a particular geographical area.

Figure 29:
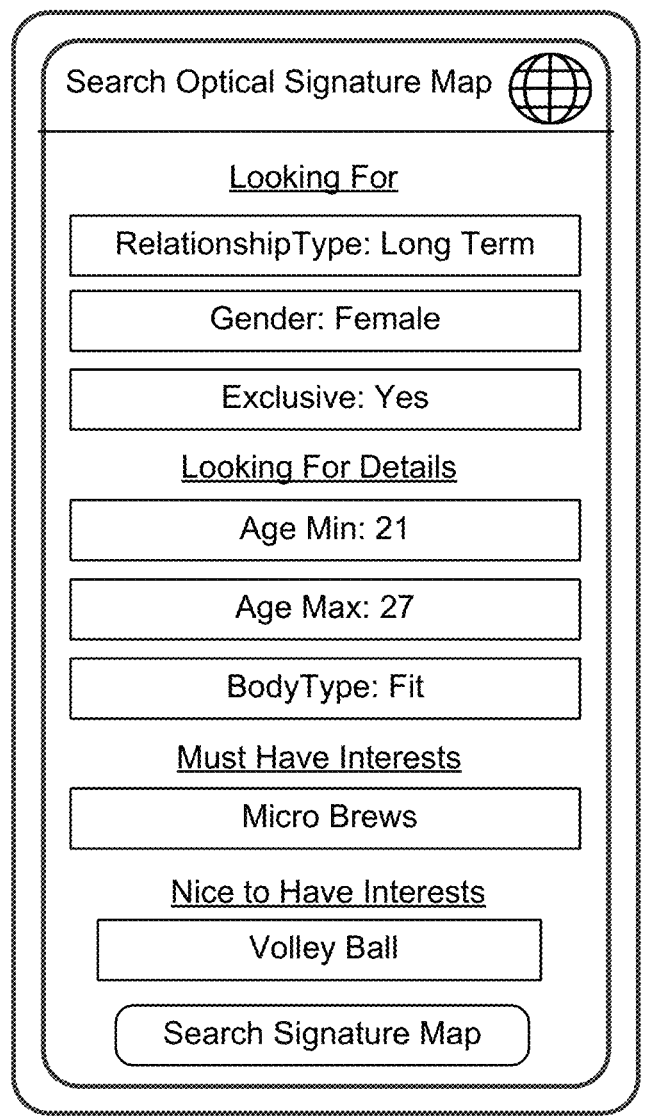
FIG. 29 illustrates an example of an optical signature client application user interface for configuring an optical signature search.

FIG. 29 illustrates an example of an optical signature client application user interface for configuring an optical signature search. This interface may open already populated with user characteristic information set up by the user in FIG. 26B. The interface of FIG. 29 allows a user to configure a search based on another user's preference for relationship type, user's gender, and exclusivity preference. The requesting user may also look for details such as a minimum age, maximum age, and body type. The user may also specify must-have interests (binary characteristic preference) such as microbrews and nice to have interests (scoring characteristic preference) such as volleyball.

Figure 30:
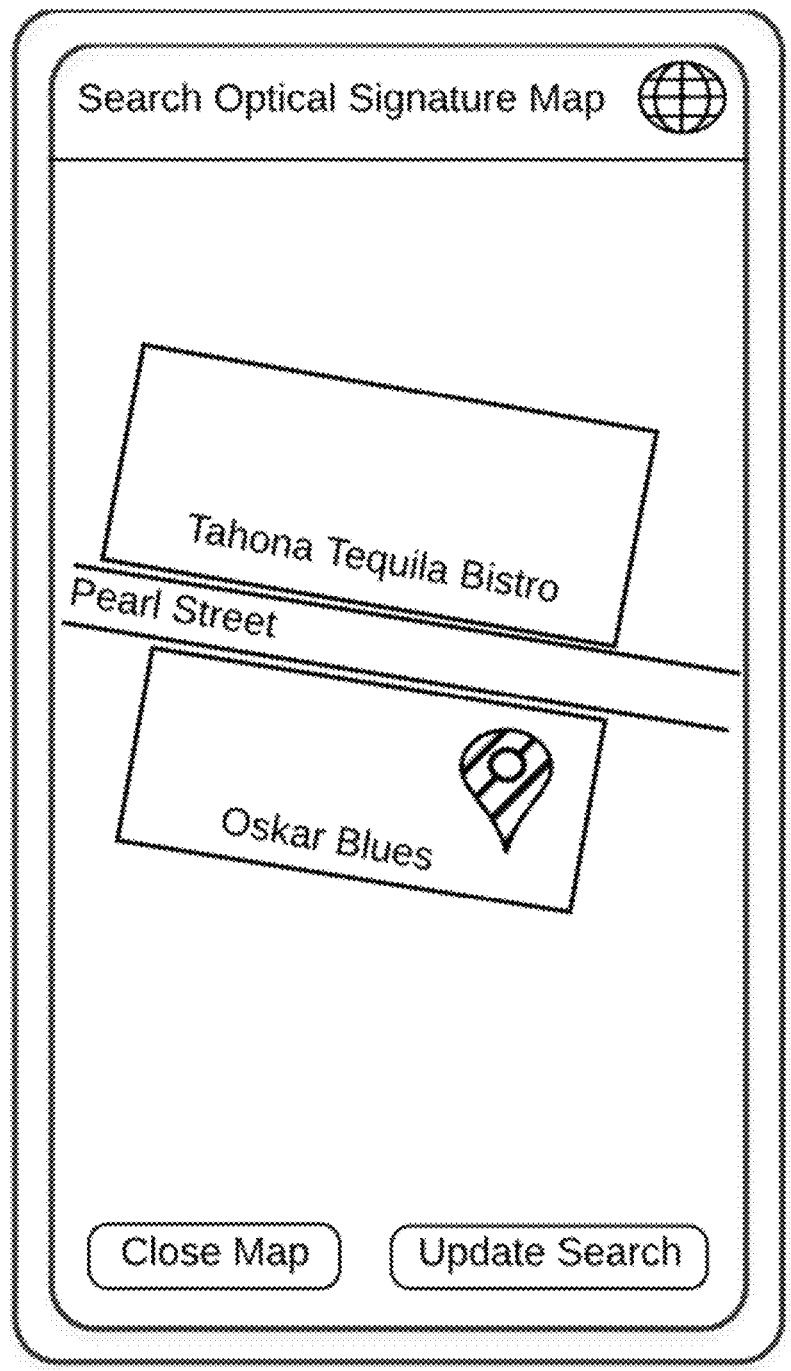
FIG. 30 illustrates an example of an optical signature client application user interface for providing search results on an optical signature map.
Figure 31:
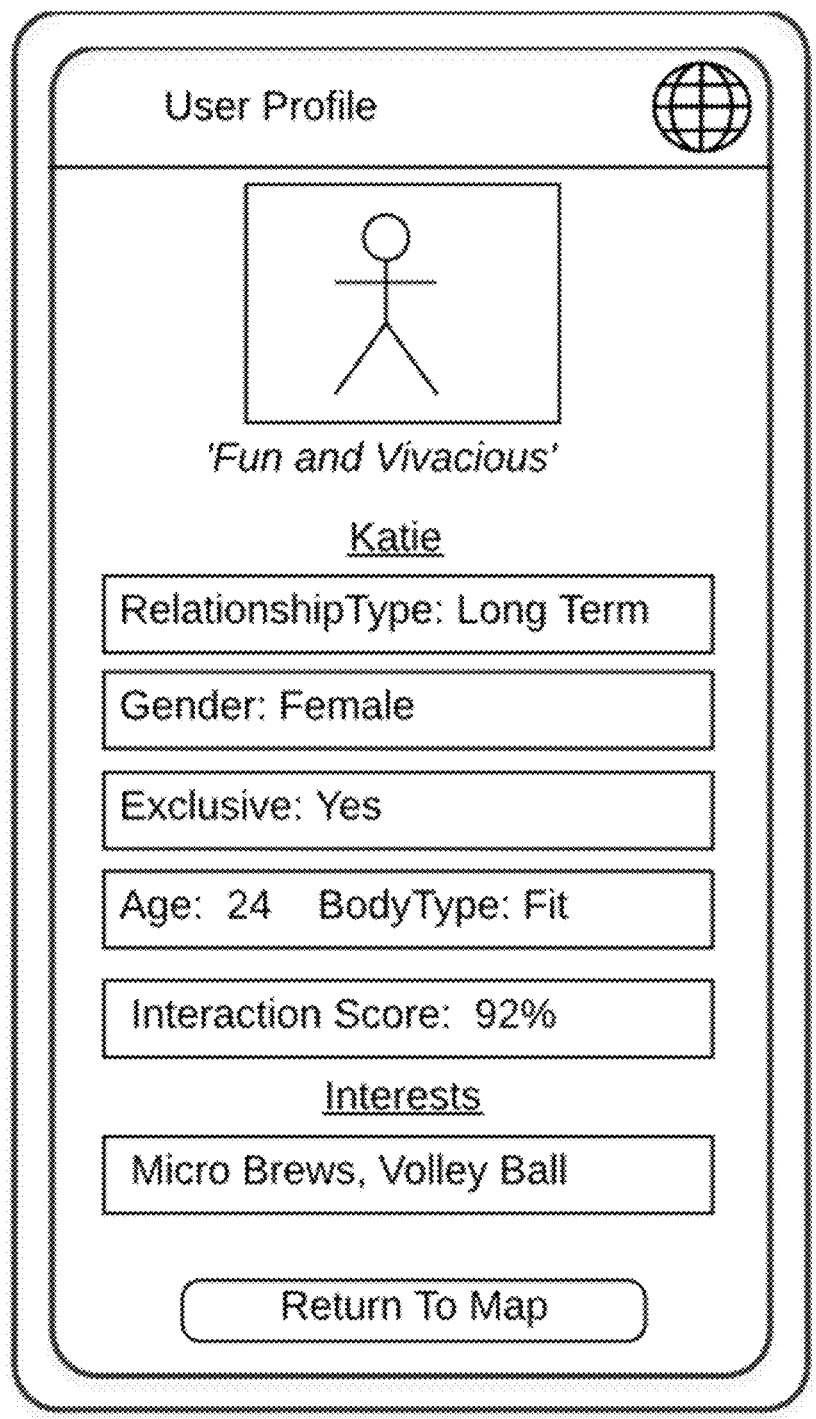
FIG. 31 illustrates an example of an optical signature client application user interface for providing profile details for user selected on an optical signature map from the interface of FIG. 30.
Figure 32:
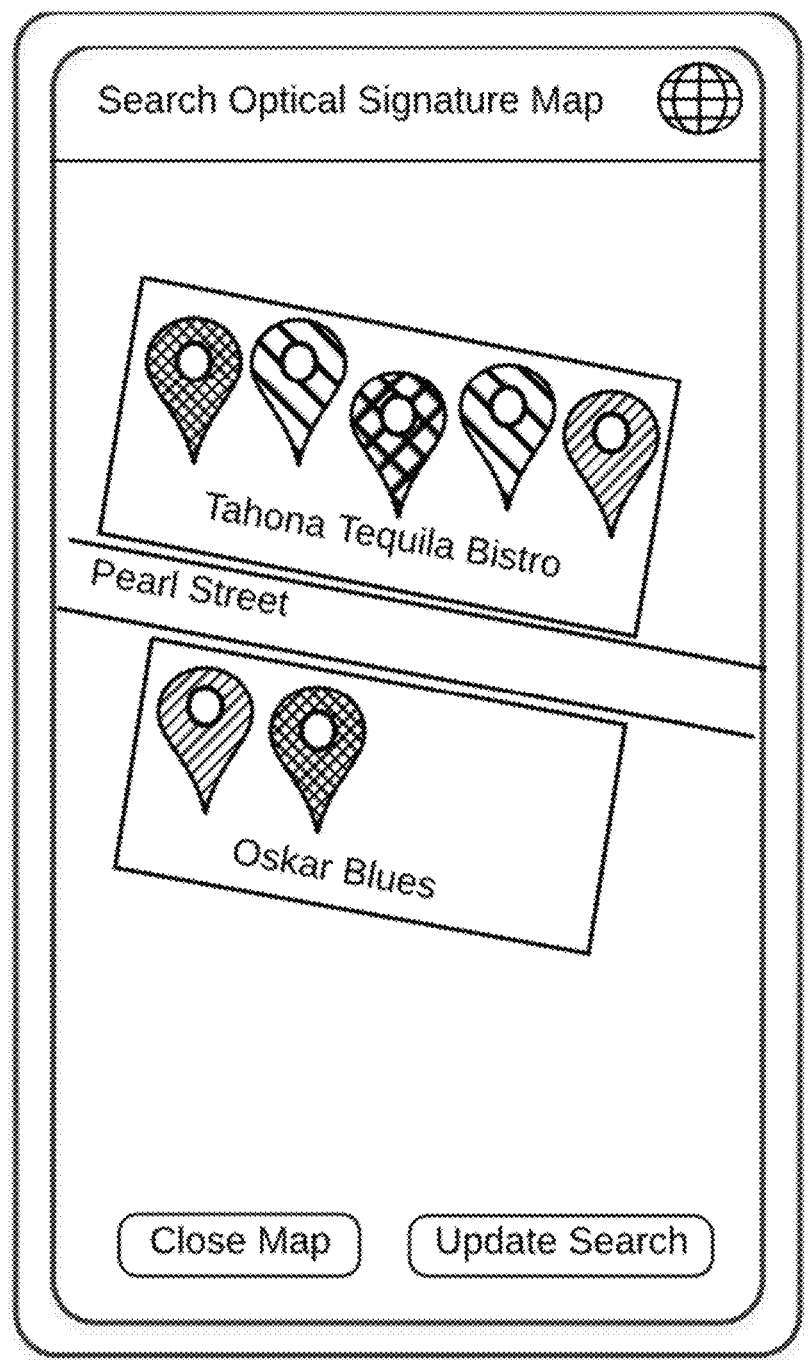
FIG. 32 illustrates another example of an optical signature client application user interface for providing search results on an optical signature map.

FIG. 30 illustrates an example of an optical signature client application user interface for providing search results on an optical signature map. In the interface of FIG. 30, a user which matches the requesting users desired characteristics is displayed as a pinpoint on the displayed search signature map. When a user pinpoint icon is selected, information regarding the user may be displayed to the requesting user through the user device display. FIG. 31 illustrates an example of an optical signature client application user interface for providing profile details for user selected on the search signature map from the interface of FIG. 30. In some instances, the displayed information may include a profile picture, name, relationship type preference, gender, exclusivity preference, age, body type, and interaction score. The user's interests may also be displayed. In some instances, multiple users may be displayed on a search signature map in response to a user search request. FIG. 32 illustrates another example of an optical signature client application user interface for providing multiple search results on an optical signature map.

Figure 33:
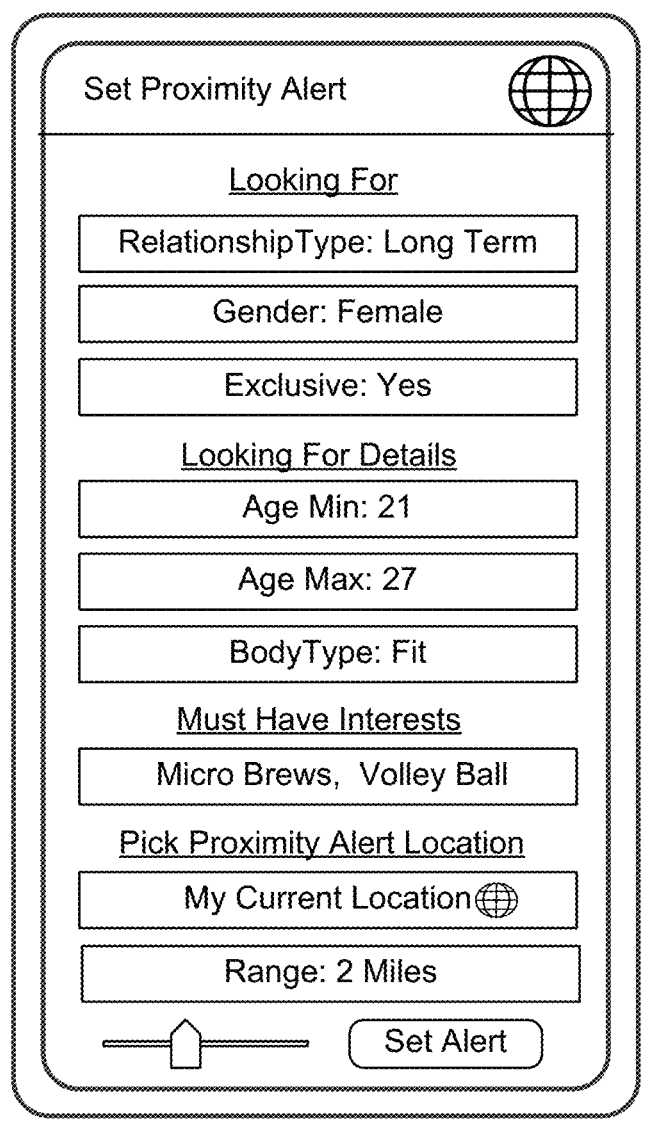
FIG. 33 illustrates an example of an optical signature client application user interface for setting a proximity alert.

FIG. 33 illustrates an example of an optical signature client application user interface for setting a proximity alert. The proximity alert user interface of FIG. 33 is similar to the search interface, except that proximity alert locations may be configured. For example, the proximity location may be set as the user's current location with a range of 2 miles. In some instances, the range may be set by entering the range manually or adjusting graphical icons such as a slider (as pictured) within the user interface. In some instances, the proximity alert can be configured for a specified location.

Figure 34:
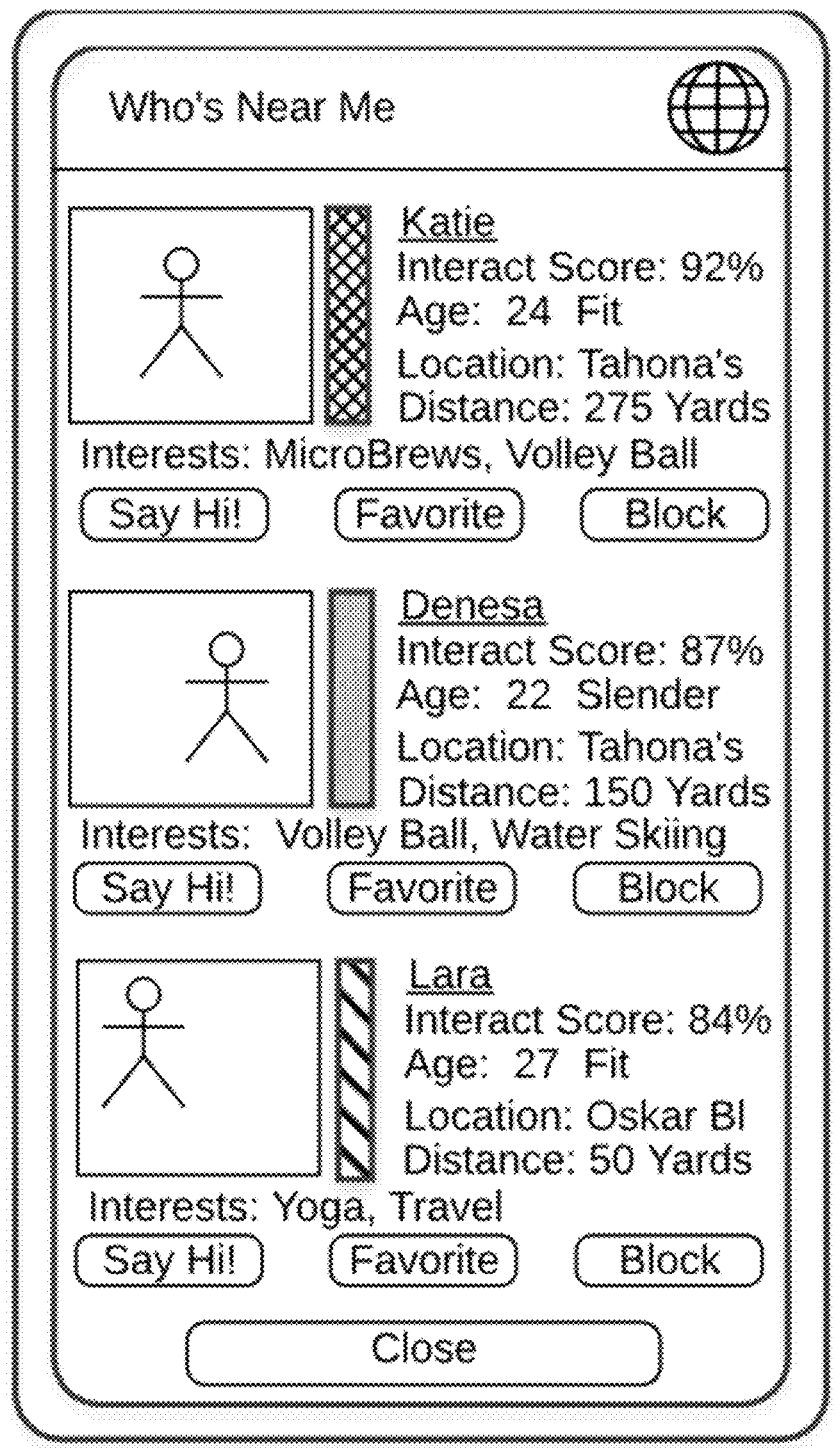
FIG. 34 illustrates an example of an optical signature client application user interface for searching for users nearby.

FIG. 34 illustrates an example of an optical signature client application user interface for searching for users nearby. After configuring proximity alerts or performing a vicinity search, a list of users near the requesting user may be displayed. User information displayed in the list may include a user image, optical signature, name, interaction score, age, location, distance, and interests. Other icons may be associated with each user in the list, such for example to block the user, make the user favorite, or send a message to the user such as "Say Hi!"

Figure 35:
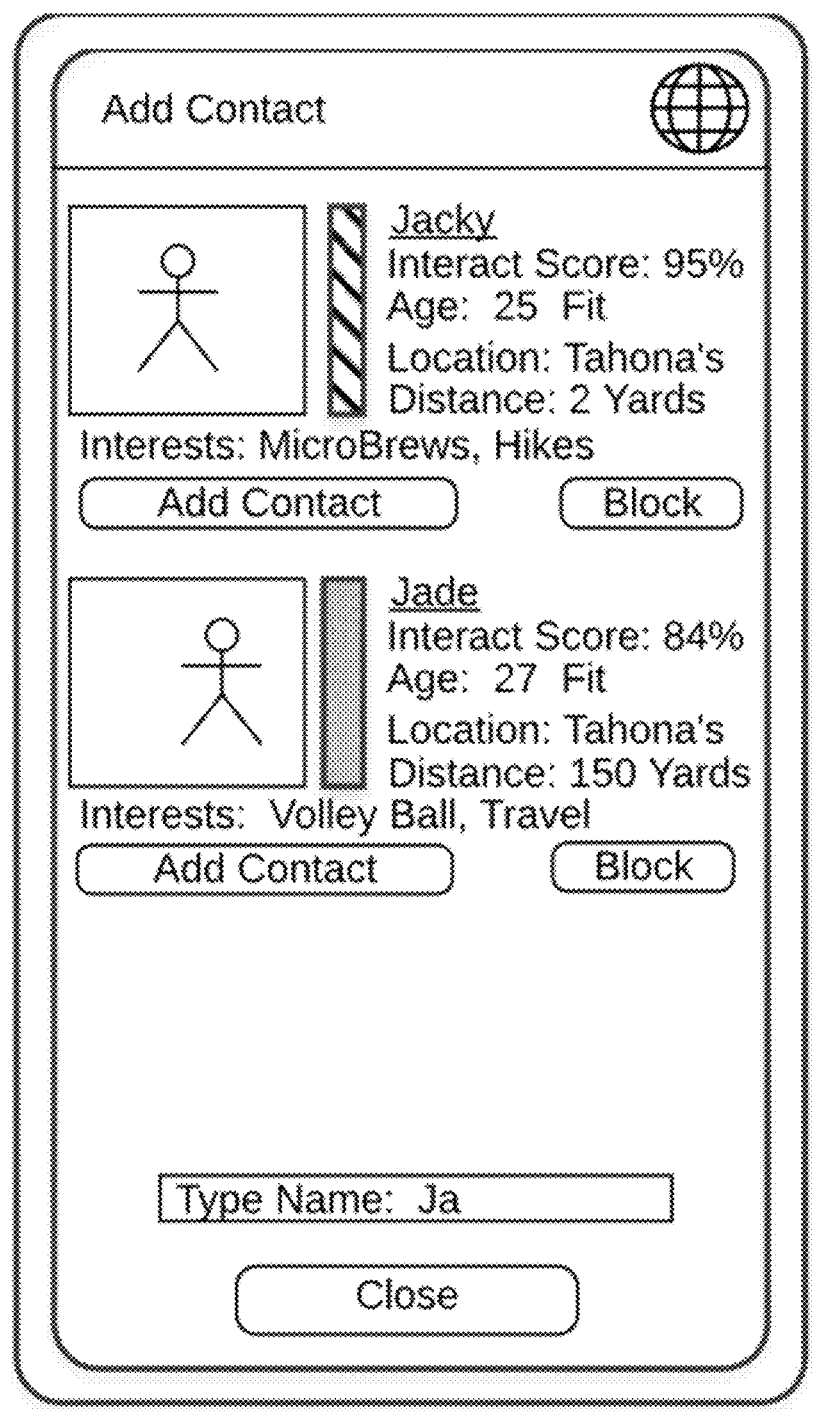
FIG. 35 illustrates an example of an optical signature client application user interface for adding a contact.

FIG. 35 illustrates an example of an optical signature client application user interface for adding a contact. The interface of FIG. 35 illustrates a list of users provided through a search, wherein the information provided for each user is similar to the list of users provided in response to a proximity alert, and a selectable icon allows the requesting user to add the listed user as a contact.

FIG. 36 illustrates an optical signature meaning index in the context of a business interaction. In the index of FIG. 36, the optical signature having an ID A-1 is associated with the meaning that the user displaying the optical signature is looking for an investor to provide seed stage investment in the user's company. In the optical signature having an ID B-1, the optical signature meaning indicates that the user displaying this optical signature is looking for a tech company representative in order to discuss potential seed stage investment in the tech company.

Figure 37:
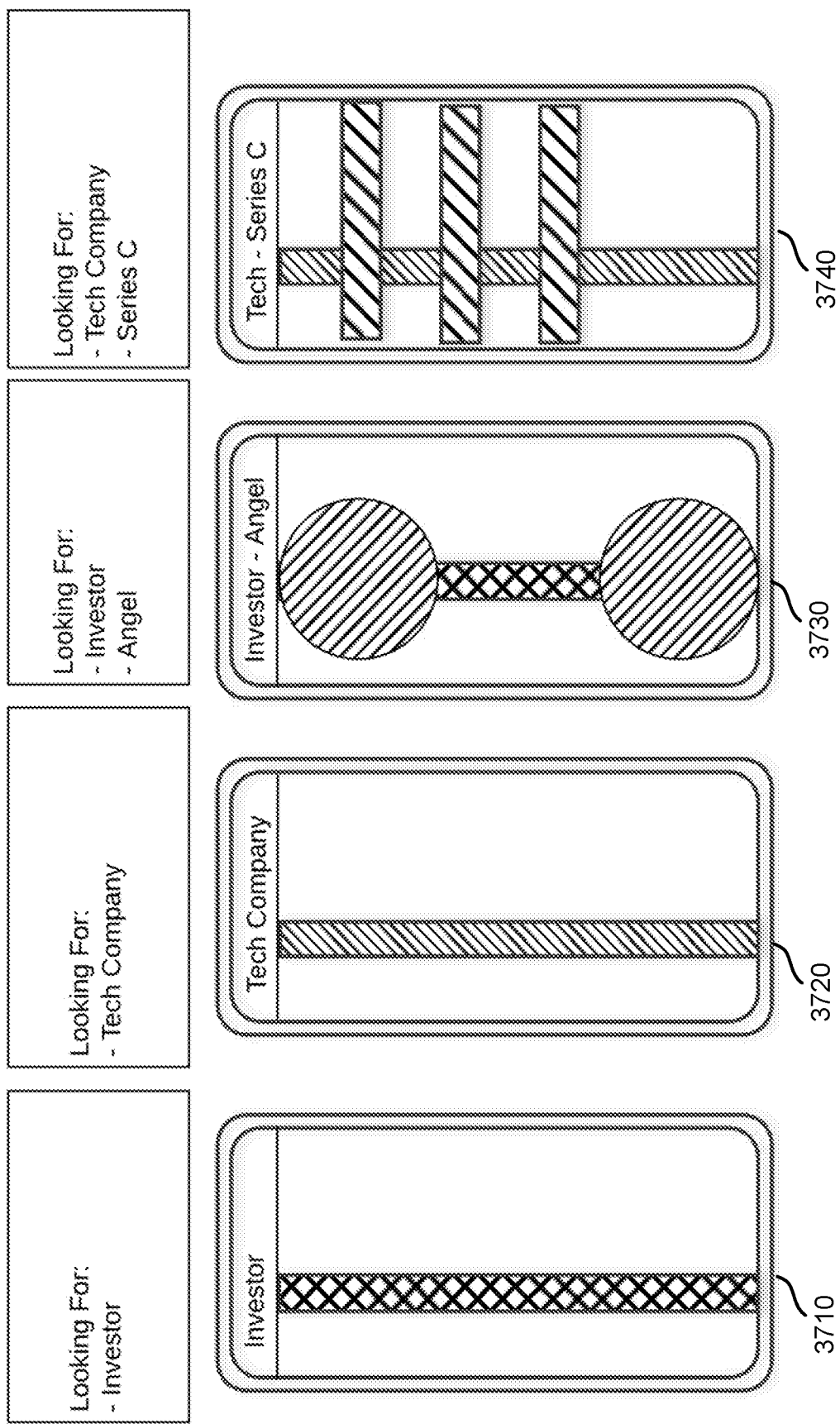
FIG. 37 illustrates examples of optical signatures related to business interactions.

FIG. 37 illustrates examples of optical signatures related to business interactions. FIG. 37 includes optimal signatures 3710, 3720, 3730, and 3740. Optical signature 3710 includes a single bar indicating the interaction type being sought by the displaying user is to meet an investor. Optical signature 3720 includes a single bar having a different color which indicates the interaction type sought by the user is to meet a tech company team member. Optical signature 3730 includes a single bar and two circles, indicating the displaying user is seeking to meet an investor with the potential to provide angel stage investment in a company. The optical signature 3740 has one vertical bar and three horizontal bars indicating the displaying user is seeking to meet a team member from a tech company that is seeking series C investment. The device displays the textual meaning of the optical signature at the top of the screen by using the optical signature meaning index.

The present technology provides optical signatures through a user device. Each optical signature can be associated with an interpersonal interaction type a user is seeking. In some instances, the interaction type is a business interaction or a social interaction. In some instances, the optical signature includes a type of business or social interaction being sought by the user. The optical signature can include characteristics of the person being sought to interact with by the user. The first device can be a cell phone, smart watch, wearable device, or other device. A server that implements some of the functionality described herein can generate optical signatures from components. In some instances, each optical signature component and corresponding optical signature component meaning are included in the optical signature meaning index. In some instances, group optical signatures can have an expiration at a time after the period of time expires.

Figure 38:
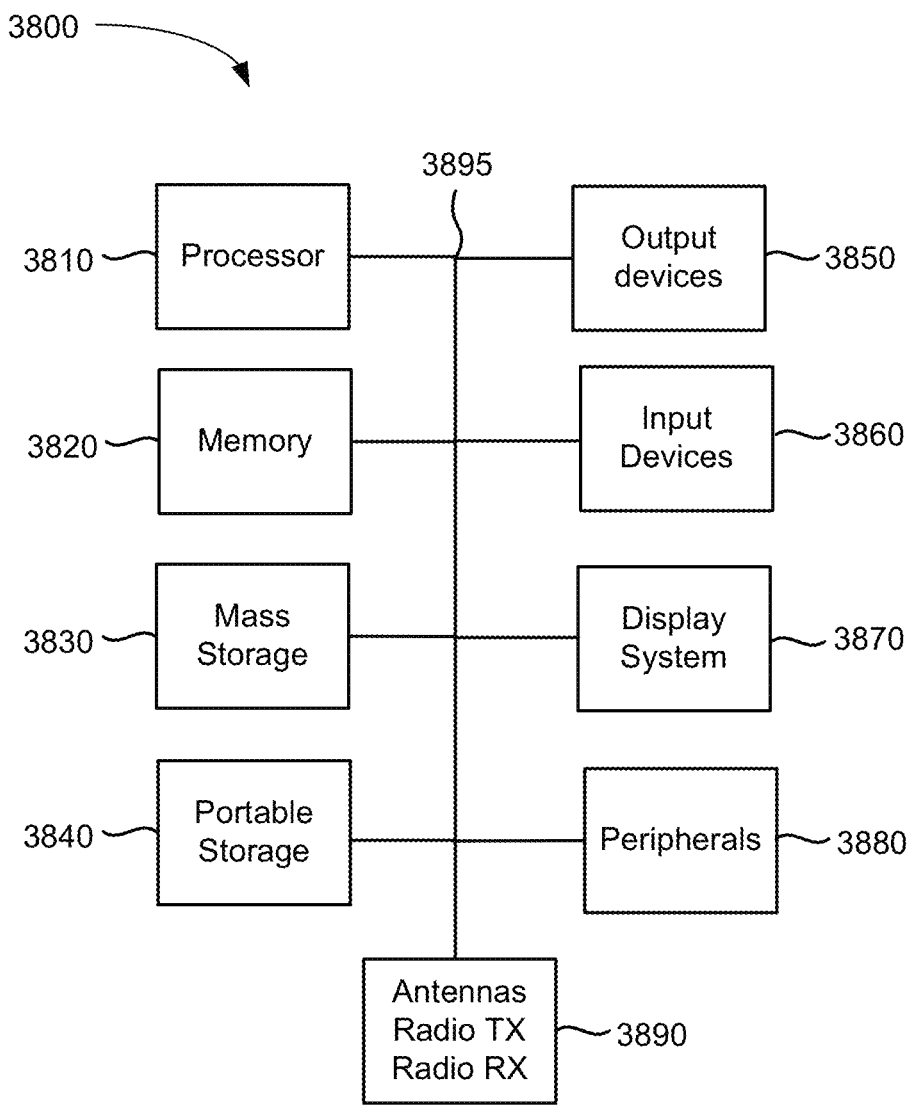
FIG. 38 illustrates a block diagram of an exemplary environment for implementing the present technology.

FIG. 38 illustrates a block diagram of an exemplary environment for implementing the present technology. System 3800 of FIG. 38 may be implemented in the contexts of the likes of machines that implement user devices 210, 240, 250, and 260, server 230, and databases 270-295. The computing system 3800 of FIG. 38 includes one or more processors 3810 and memory 3820. Main memory 3820 stores, in part, instructions and data for execution by processor 3810. Main memory 3820 can store the executable code when in operation. The system 3800 of FIG. 38 further includes a mass storage device 3830, portable storage medium drive(s) 3840, output devices 3850, user input devices 3860, a graphics display 3870, and peripheral devices 3880.

The components shown in FIG. 38 are depicted as being connected via a single bus 3890. However, the components may be connected through one or more data transport means. For example, processor unit 3810 and main memory 3820 may be connected via a local microprocessor bus, and the mass storage device 3830, peripheral device(s) 3880, portable storage device 3840, and display system 3870 may be connected via one or more input/output (I/O) buses.

Mass storage device 3830, which may be implemented with a magnetic disk drive, an optical disk drive, a flash drive, or other device, is a non-volatile storage device for storing data and instructions for use by processor unit 3810. Mass storage device 3830 can store the system software for implementing embodiments of the present invention for purposes of loading that software into main memory 3820.

Portable storage device 3840 operates in conjunction with a portable non-volatile storage medium, such as a floppy disk, compact disk or Digital video disc, USB drive, memory card or stick, or other portable or removable memory, to input and output data and code to and from the computer system 3800 of FIG. 38. The system software for implementing embodiments of the present invention may be stored on such a portable medium and input to the computer system 3800 via the portable storage device 3840.

Input devices 3860 provide a portion of a user interface. Input devices 3860 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 3800 as shown in FIG. 38 includes output devices 3850. Examples of suitable output devices include speakers, printers, network interfaces, monitors, mobile and wearable device displays.

Display system 3870 may include a liquid crystal display (LCD) or other suitable display device. Display system 3870 receives textual and graphical information and processes the information for output to the display device. Display system 3870 may also receive input as a touch-screen. In some instances, display system 3870 may display content as directed by a hardware control engine 330 of FIG. 3.

Peripherals 3880 may include any type of computer support device to add additional functionality to the computer system. For example, peripheral device(s) 3880 may include a modem or a router, printer, and other device.

The system of 3800 may also include, in some implementations, antennas, radio transmitters and radio receivers 3890. The antennas and radios may be implemented in devices such as smart phones and watches, wearable devices, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 3800 of FIG. 38 are those typically found in computer systems that may be suitable for use with embodiments of the present invention and are intended to represent a broad category of such computer components that are well known in the art. Thus, the computer system 3800 of FIG. 38 can be a personal computer, handheld computing device, smart phone, smart watch, wearable device, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for providing an optical signature on a user device, comprising:
   receiving an optical signature set from a remote server by a first device associated with a first user, the optical signature set containing a plurality of optical signatures, each optical signature associated with an interpersonal interaction type a user is seeking;
   selecting, based on input from the first user received by the first device, an optical signature to display by the first device from the optical signature set;
   displaying the optical signature on the first device, the optical signature displayed at a scale such that the optical signature is viewable and is interpretable by a second user not associated with the first device; and
   providing optical signature data associated with the first user's displayed optical signature, desired interaction types, and desired user characteristics sought by the first user to the remote server.

2. The method of claim 1, wherein each optical signature is associated with user characteristics.

3. The method of claim 1, wherein providing optical signature data includes providing first user characteristics and geolocation coordinates to the remote server.

4. The method of claim 1, further comprising:
   providing, by the first device to a remote server, search parameters including interaction types being sought and first user characteristics of interest;
   receiving, by the first device from the server, search results data including displayed optical signature, user characteristics, and geolocation coordinates of one or more second users based on the search parameters; and
   displaying the search results data received from the remote server associated with the one or more second users, the search results data including displayed optical signature, user characteristics, and geolocation coordinates of the one or more second users matching the search parameters.

5. The method of claim 1, further comprising receiving an optical signature meaning index, the optical signature associated with a meaning specifying a visual output from a device, a meaning of the optical signature being specified by the optical signature meaning index, the optical signature meaning index specifying an interpersonal interaction type and characteristics of one or more second users being sought for interaction.

6. The method of claim 1, wherein the optical signature is associated with a displayed graphic element that includes a rectangle, square, triangle, or circle.

7. The method of claim 1, wherein the optical signature is comprised of any combination of shapes, colors, geometric patterns, slow or rapid changes in illumination or use of flashing or pulsing lights or displays, images, graphic, animation, holographic image or video displayed statically or in motion.

8. The method of claim 1, wherein each optical signature in the optical signature set is a non-textual representation associated with an interpersonal relationship type or characteristic of a second user being sought for interaction by the first user.

9. The method of claim 1, wherein the type of personal interaction is a social interaction, the optical signature associated with a user characteristic that includes relationship preference and preference for a male or female or other gender identification.

10. The method of claim 1, further comprising:
transmitting a request for users associated with requested user characteristics by the first device to the server;
receiving a response from the server by the first device, the response including one or more matching users, wherein each matching user is associated with a predicted interaction score and a geographical location that satisfies the requested user characteristics; and
displaying the one or more matching users on the display of the first device.

11. The method of claim 1, further comprising:
transmitting a request for a service from the first device to the server; and
receiving an optical signature by the first device from the server in response to the service request, the optical signature in response to the service request and having an expiration date and time,
the server providing a copy of the optical signature received by the first device in response to the service request to a third user that provides a service to the user, the copy of the optical signature having the same expiration date and time.

12. The method of claim 1, further comprising:
receiving a group optical signature by the first device, the group optical signature transmitted to the first device and one or more additional devices, the group optical signature at the first device and one or more additional devices synchronously updating at the same time based on an event.

13. The method of claim 12, wherein the event is a period of time, the group optical signature having an expiration at a time after the period of time expires.

14. The method of claim 1, wherein type of interpersonal interaction is a business interaction, the optical signatures each associated with a user characteristic that includes interaction type and characteristics of the entity desired to interact with and of the transaction being sought.

15. The method of claim 1, wherein a plurality of devices associated with a plurality of users, the plurality of users including the first user, receive an identical optical signature set to ensure synchronized display of optical signatures across the plurality of devices, wherein the meaning for each optical signature is accessible to all users of the system.

16. A non-transitory computer readable storage medium having embodied thereon a program, the program being executable by a processor to perform a method for providing an optical signature on a personal device, the method comprising:
receiving an optical signature set from a remote server by a first device associated with a first user, the optical signature set containing a plurality of optical signatures, each optical signature associated with an interpersonal interaction type a user is seeking;
selecting, based on input from the first user received by the first device, an optical signature to display by the first device from the optical signature set;
displaying the optical signature on the first device, the optical signature displayed at a scale such that the optical signature is viewable and is interpretable by a second user not associated with the first device; and
providing optical signature data associated with the first user's displayed optical signature, desired interaction types, and desired user characteristics sought by the first user to the remote server.

17. A method for providing an optical signature, comprising:
generating, by a server, an optical signature set, the optical signature set containing a plurality of optical signatures, wherein each optical signature set includes an optical signature meaning index and effective and expiration dates for the set;
the optical signatures generated from optical signature components associated with an optical signature meaning and an interaction type or a user characteristic;
receiving a request for an optical signature set from a remote device by the server, the request including a user identifier; and
transmitting the optical signature set to the remote device by the server.

18. The method of claim 17, further comprising receiving first user characteristics including the interaction types sought by the first user and the user characteristics of the person the first user desires to interact with.

19. The method of claim 17, further comprising receiving a signature ID associated with an optical signature displayed by the user, a user ID, and geolocation coordinates provided by the first device, the server updating the user to optical signature to geolocation index based on the received signature ID, user ID, and geolocation coordinates.

20. The method of claim 19, wherein the geolocation coordinates are automatically transmitted by the first device and received at the server at regular intervals to update geolocation coordinates stored by the server.

21. The method of claim 17, further comprising receiving updates by the server and from the remote device displayed optical signature or user characteristic information.

22. The method of claim 17, further comprising receiving, from the remote device, search requests including user characteristics being sought including interaction type and geographic search area are transmitted to the central server.

23. The method of claim 17, wherein the optical signature components are each associated with a displayable graphic element that includes a rectangle, square, triangle, or circle.

24. The method of claim 17, wherein the optical signature is comprised of any combination of shapes, colors, geometric patterns, slow or rapid changes in illumination or use of flashing or pulsing lights or displays, images, graphic, animation, holographic image or video displayed statically or in motion.

25. The method of claim 17, wherein the type of personal interaction is a social interaction, the optical signature components each associated with a user characteristic that includes relationship preference and preference for a male or female.

26. The method of claim 17, further comprising:
receiving a request, by the server and from the first device, for users associated with requested user characteristics;
generating, by the server, a response including user data for one or more matching users, wherein each matching user is associated with a predicted interaction score and a geographical location data that satisfies the requested user characteristics, user data and geographical location data to be displayed by the device; and
transmitting the response by the server to the first device.

27. The method of claim 17, further comprising:
receiving a request for a service from the first device by the server;
generating an optical signature by the server in response to the service request, the optical signature in response to the service request having an expiration date and time;
transmitting the generated optical signature to the first device; and
transmitting a copy of the generated optical signature to a second device that is selected to provide that requested service to the user, the copy of the optical signature having the same expiration date and time as the generated optical signature.

28. The method of claim 17, further comprising:
detecting a group optical signature event by the server;
generating a group optical signature by the server;
transmitting the same group optical signature to the first device and one or more additional devices;
generating an update to the group optical signature by the server; and
transmitting the same updated group optical signature to the device and one or more additional devices based on an event.

29. The method of claim 17, wherein type of interpersonal interaction is a business interaction, the optical signatures each associated with a user characteristic that includes interaction type and characteristics of the entity desired to interact with and of the transaction being sought.

30. A non-transitory computer readable storage medium having embodied thereon a program, the program being executable by a processor to perform a method for providing an optical signature, the method comprising:
generating, by a server, an optical signature set, the optical signature set containing a plurality of optical signatures, wherein each optical signature set includes an optical signature meaning index and effective and expiration dates for the set;
the optical signatures generated from optical signature components associated with an optical signature meaning and an interaction type or a user characteristic;
receiving a request for an optical signature set from a remote device by the server, the request including a user identifier; and
transmitting the optical signature set to the remote device by the server.

* * * * *